(12) United States Patent
Beck et al.

(10) Patent No.: US 12,344,098 B2
(45) Date of Patent: Jul. 1, 2025

(54) HYBRID TRANSMISSION DEVICE AND MOTOR VEHICLE COMPRISING A HYBRID TRANSMISSION DEVICE

(71) Applicant: ZF Friedrichshafen AG, Friedrichshafen (DE)

(72) Inventors: Stefan Beck, Eriskirch (DE); Johannes Kaltenbach, Friedrichshafen (DE); Michael Wechs, Weißensberg (DE); Fabian Kutter, Kressbronn (DE); Thomas Martin, Weissensberg (DE); Martin Brehmer, Tettnang (DE); Max Bachmann, Friedrichshafen (DE); Peter Ziemer, Bad Woerishofen (DE); Christian Michel, Ravensburg (DE); Matthias Horn, Tettnang (DE); Mladjan Radic, Langenargen (DE); Ingo Pfannkuchen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/559,144

(22) PCT Filed: Nov. 30, 2021

(86) PCT No.: PCT/EP2021/083437
§ 371 (c)(1),
(2) Date: Nov. 6, 2023

(87) PCT Pub. No.: WO2022/233444
PCT Pub. Date: Nov. 10, 2022

(65) Prior Publication Data
US 2024/0239180 A1    Jul. 18, 2024

(30) Foreign Application Priority Data
May 6, 2021   (DE) .................. 10 2021 204 618.5

(51) Int. Cl.
*B60K 6/442* (2007.10)
*B60K 6/365* (2007.10)
(Continued)

(52) U.S. Cl.
CPC .............. *B60K 6/547* (2013.01); *B60K 6/365* (2013.01); *B60K 6/40* (2013.01); *B60K 6/442* (2013.01);
(Continued)

(58) Field of Classification Search
CPC ....... B60K 2006/4816–4833; B60K 6/36–547; F16H 3/091–093;
(Continued)

(56) References Cited

U.S. PATENT DOCUMENTS 6,024,182 A    2/2000  Hamada et al.
7,220,200 B2   5/2007  Sowul et al.
(Continued)

FOREIGN PATENT DOCUMENTS

DE    102005035406 A1    3/2006
DE    102013215114 A1    2/2015
(Continued)

OTHER PUBLICATIONS

International Search Report (English Translation) PCT/EP2021/083437, dated Jan. 27, 2022. (2 pages).
German Office Action DE 10 2021 204 618.5, dated Jan. 24, 2022. (10 pages).

*Primary Examiner* — Ernesto A Suarez
*Assistant Examiner* — Lillian T Nguyen
(74) *Attorney, Agent, or Firm* — Dority & Manning, P.A.

(57) ABSTRACT

A hybrid transmission device (1) includes a first transmission input shaft (2), a second transmission input shaft (4), a superposition gear unit (6) arranged axially parallel to the first transmission input shaft (2) and to the second transmission input shaft (4) and configured for connecting an electric (Continued)

machine (5). The superposition gear unit (6) includes a first planetary gear set (P1) with a sun gear (P11), a ring gear (P12), and a planet carrier (P13) with planet gears (P14) rotatably arranged thereon. A gear reduction stage (7) includes a first spur gear pair (ST1) and a second spur gear pair (ST2) for connecting the superposition gear unit (6) to a differential (8). At least a first shift element (A), a second shift element (B), and a third shift element (C) are configured for implementing an electrodynamic driving-off process and a purely electric or hybridized drive of the motor vehicle.

18 Claims, 13 Drawing Sheets

(51) Int. Cl.
*B60K 6/40* (2007.10)
*B60K 6/547* (2007.10)
*F16H 37/08* (2006.01)

(52) U.S. Cl.
CPC ...... *F16H 37/0806* (2013.01); *B60Y 2200/92* (2013.01); *F16H 2200/2005* (2013.01); *F16H 2200/2043* (2013.01)

(58) Field of Classification Search
CPC ...... F16H 2200/2005; F16H 3/52–3/66; F16H 2200/2038–2061; B06K 1/02
See application file for complete search history.

(56) References Cited

U.S. PATENT DOCUMENTS

| | | | |
|---|---|---|---|
| 9,764,630 | B2 | 9/2017 | Kaltenbach et al. |
| 9,950,607 | B2 | 4/2018 | Littlefield et al. |
| 10,995,840 | B2 | 5/2021 | Pinschmidt et al. |
| 11,285,799 | B1 * | 3/2022 | Cho ................... B60K 6/387 |
| 11,518,233 | B2 | 12/2022 | Kluge et al. |
| 2009/0098969 | A1 * | 4/2009 | Tabata ................ B60K 6/365 |
| | | | 903/910 |
| 2010/0009805 | A1 * | 1/2010 | Bachmann ........... B60W 10/08 |
| | | | 180/65.21 |
| 2013/0203543 | A1 | 8/2013 | Sten |
| 2014/0100072 | A1 * | 4/2014 | Kaltenbach ............ F16H 3/126 |
| | | | 475/151 |
| 2015/0107408 | A1 * | 4/2015 | Kaltenbach ............. B60K 6/36 |
| | | | 903/910 |
| 2020/0331336 | A1 * | 10/2020 | Kaltenbach ............. B60K 6/38 |
| 2021/0138889 | A1 | 5/2021 | Köpfler et al. |

FOREIGN PATENT DOCUMENTS

| | | | |
|---|---|---|---|
| DE | 102016120971 A1 | | 5/2017 |
| DE | 102016200583 A1 * | | 7/2017 |
| DE | 102017220071 A1 | | 5/2019 |
| DE | 102017220168 A1 | | 5/2019 |
| DE | 102017221775 A1 | | 6/2019 |
| DE | 102019215196 A1 | | 4/2021 |
| FR | 3100756 A1 | | 3/2021 |
| WO | WO 2019/201370 A1 | | 10/2019 |

* cited by examiner

HYBRID TRANSMISSION DEVICE AND MOTOR VEHICLE COMPRISING A HYBRID TRANSMISSION DEVICE

CROSS-REFERENCE TO RELATED APPLICATIONS

The present application is related and has right of priority to German Patent Application No. DE102021204618.5 filed on May 6, 2021 and is a U.S. national phase of PCT/EP2021/083437 filed Nov. 30, 2021, both of which are incorporated by reference in their entireties for all purposes.

FIELD OF THE INVENTION

The invention relates generally to a hybrid transmission device for a motor vehicle. The invention further relates generally to a motor vehicle that includes a hybrid transmission device.

BACKGROUND

DE 10 2013 215 114 A1 describes a hybrid drive of a motor vehicle, the hybrid drive including an internal combustion engine that has a drive shaft, an electric machine that has a rotor, an automated manual transmission of a countershaft design including an input shaft and at least one output shaft, and a superposition gear unit of a planetary design including two input elements and one output element. The input shaft of the transmission is connectable to the drive shaft of the internal combustion engine via a controllable separating clutch, and the input shaft is bringable into a drive connection with the output shaft via multiple selectively engageable spur gear stages. The drive shaft of the internal combustion engine and the rotor of the electric machine are drivingly connectable to the output shaft of the transmission via the superposition gear unit. The superposition gear unit is coaxially arranged over a free end of the output shaft. The first input element of the superposition gear unit is also rotationally fixed to a hollow shaft arranged coaxially over the output shaft, the hollow shaft being rotationally fixable via a coupling shift element to an idler gear of the directly axially adjacent spur gear stage of the transmission in order to couple the internal combustion engine and being rotationally fixable via a bypass shift element to the second input element or to the output element of the superposition gear unit in order to bypass the superposition gear unit. Alternatively, in order to bypass the superposition gear unit via a bypass shift element, the second input element of the superposition gear unit is connectable to the output element of the superposition gear unit, wherein the second input element of the superposition gear unit is permanently in a drive connection with the rotor of the electric machine and the output element of the superposition gear unit is rotationally fixed to the output shaft.

SUMMARY OF THE INVENTION

Example aspects of the invention provide a compact design of a hybrid transmission device.

A hybrid transmission device according to example aspects of the invention for a motor vehicle includes at least a first transmission input shaft for connecting an internal combustion engine, at least a second transmission input shaft for connecting a rotor of a first electric machine, a superposition gear unit, which is arranged so as to be axially parallel to the first transmission input shaft and to the second transmission input shaft and is designed for connecting the first electric machine, wherein the superposition gear unit has at least a first planetary gear set, wherein the particular planetary gear set has a sun gear, a ring gear, and a planet carrier with planet gears rotatably arranged thereon, a gear reduction stage that includes at least a first spur gear pair and a second spur gear pair for connecting the superposition gear unit to a differential, wherein the differential has a first axle shaft and a second axle shaft, each of which is designed for connecting a wheel of the motor vehicle, wherein the second axle shaft extends axially at least through the superposition gear unit, and at least a first shift element, a second shift element, and a third shift element for implementing an electrodynamic driving-off process and a purely electric or hybridized drive of the motor vehicle.

The internal combustion engine is preferably directly connected to the first transmission input shaft, wherein the first transmission input shaft is coupled or integrally connected, in particular, to a crankshaft of the internal combustion engine. Further preferably, the first electric machine is directly connected to the second transmission input shaft. The second transmission input shaft is coupled or integrally connected, in particular, to a rotor of the first electric machine.

In one exemplary embodiment, the drive power generated by the internal combustion engine and/or the first electric machine is combined and/or superposed in the superposition gear unit and transmitted via the output of the superposition gear unit onto the gear reduction stage and, from there, onto the differential. In the differential, the drive power is split onto the two axle shafts and transmitted to a driving wheel of the motor vehicle operatively connected to the particular axle shaft. It is conceivable, by engaging an appropriate shift element, to realize a redirection of at least a portion of the drive power with a certain ratio directly from the internal combustion engine and/or the particular electric machine onto the gear reduction stage.

The term "operatively connected" and the term "operative connection" are to be understood to mean, in this context, in particular, a permanent connection between two components, the permanent connection being provided for a permanent transmission of a rotational speed and/or a torque. The connection can be implemented directly or indirectly, for example, via a fixed ratio. The connection can be implemented, for example, via a fixed shaft, a toothing of a gearwheel, in particular a spur gear tooth system, and/or a wrap-around or traction mechanism, in particular chains or toothed belts. In an indirect connection, a further component can be provided between the two components. For example, further shafts and/or gearwheels can be operatively arranged between two shafts. An operative connection is to be understood to be, in particular, a driving connection.

The term "at least indirectly" is to be understood to mean that two components are (operatively) connected to each other via at least one further component, which is arranged between the two components, or are directly and, thereby, immediately connected to each other.

The superposition gear unit is a planetary transmission that includes at least one planetary gear set, wherein the components of the superposition gear unit that are operatively connected to one another, in particular the ring gear, the sun gear, and the planet carrier, of the at least first planetary gear set are designed as hollow shafts or ring gears, such that the second axle shaft of the differential can be guided axially through the superposition gear unit. The differential can be designed, for example, as a ball differential, a spur gear differential, or a planetary differential. The axle shafts are jointly arranged on an output axis. A countershaft of the gear reduction stage, the first transmission input shaft, and the second transmission input shaft are arranged so as to be axially parallel to the output axis. Therefore, the differential and the superposition gear unit are also arranged on or coaxially to the output axis. Therefore, the internal combustion engine and the particular electric machine are also arranged so as to be axially parallel to the output axis.

At least one purely electric drive of the motor vehicle can be implemented via the superposition gear unit depending on the engagement position of the shift elements, wherein exclusively the drive power of the particular electric machine is transmitted onto the output. In particular, at least one forward gear step and at least one reverse gear step are implementable by the particular electric machine in a first engagement position of the shift elements. An electrodynamic driving-off process (also referred to in the following as EDA or EDA mode), in particular, can be realized in forward travel by the first electric machine. Similarly, a hybridized drive of the motor vehicle can be implemented by appropriately engaging the shift elements, in which the drive power of the particular electric machine and the drive power of the internal combustion engine are both transmitted onto the output. The superposition gear unit is advantageously positioned at the differential shaft and, therefore, in an installation space-saving manner.

Preferably, the first shift element, in the engaged condition, is provided for drivingly connecting the ring gear or the sun gear of the first planetary gear set of the superposition gear unit to the internal combustion engine. According to one exemplary embodiment, the first transmission input shaft is operatively connected to the first shift element at least via a first traction mechanism or via at least a first intermediate gear. The first shift element is designed, in particular, for connecting, in the engaged condition, the internal combustion engine, in particular via the point of connection of the internal combustion engine, i.e., the first traction mechanism or the first intermediate gear, either to the ring gear of the planetary gear set of the superposition gear unit or to the sun gear of the planetary gear set of the superposition gear unit. Preferably, the first transmission input shaft is connected or connectable via a fixed ratio or a first gear stage, including the first traction mechanism or the first intermediate gear, to the sun gear or to the ring gear of the superposition gear unit depending on the engagement position of the first shift element. The output at the superposition gear unit takes place in both cases preferably via the planet carrier of the first planetary gear set of the superposition gear unit. As a result, in particular, weight and installation space can be achieved due to increased flexibility and compactness.

An electrodynamic driving-off mode of the motor vehicle, in particular, is engageable by the first shift element. If the ring gear of the superposition gear unit is operatively connected to the internal combustion engine in the engaged condition of the first shift element, and, conversely, if the sun gear of the superposition gear unit is operatively connected to the first electric machine, a typical EDA gear set connection is present. The advantage is the comparatively low supporting torque. By comparison, an inverse EDA gear set connection is present in an alternative embodiment of the device and, in fact, when the sun gear of the superposition gear unit is operatively connected to the internal combustion engine in the engaged condition of the first shift element and, simultaneously, the ring gear of the superposition gear unit is operatively connected to the first electric machine. The advantage of the inverse EDA gear set connection is essentially that the first electric machine is drivable in the EDA mode at a lower compensating rotational speed. The drive can be carried out in a hybridized manner with the first shift element engaged.

In this context, a "shift element" is to be understood to be a unit that includes at least two coupling elements and one actuator or engagement mechanism, which is provided for establishing a disengageable connection between the at least two coupling elements. The shift element is designed such that a switch can be carried out between an engaged condition and a disengaged condition by the engagement mechanism. In the engaged condition of the particular shift element, a drive power, in particular a rotational speed and/or a torque, is transmitted from a first component onto the second component, or vice versa. The two components are therefore drivingly connected or coupled or rotationally fixed to each other. In the disengaged condition of the particular shift element, by comparison, no drive power is transmitted from the first component onto the second component, or vice versa. The two components are therefore not drivingly connected or coupled or rotationally fixed to each other. In the disengaged condition, the particular shift element is in a neutral position. The shift element can also include more than two coupling elements depending on the design, wherein at least one further coupling element can be provided for establishing a rotationally fixed connection by generating a frictional connection or a positive engagement. A "coupling element" is to be understood to be, in particular, an element of the shift element that is permanently rotationally fixed to a transmission element, such as, for example, a shaft, an idler gear, and/or a fixed gear. Moreover, the term "coupling element" is to be understood to be an axially and radially fixed element, which is provided with an actuator or engagement mechanism for establishing a friction-locking, force-fit and/or form-locking connection to an engagement mechanism, such as, for example, an idler gear, which includes toothing for connection to the engagement mechanism, or a disk carrier of a friction-locking shift unit. An "engagement mechanism" of a shift element is to be understood to be, in particular, an element that is connected to one of the coupling elements in a permanently rotationally fixed but axially and/or radially movable manner and that is provided for a friction-locking, force-fit and/or form-locking connection to at least one more of the coupling elements, such as, for example, a synchronizer sleeve of a shift element designed as a form-locking shift element or an axially movable friction disk of a shift element designed as a friction-locking shift element.

Preferably, the particular shift element is a form-locking shift element. A "form-lockingly designed shift element" is to be understood to be, in particular, a shift element that has toothing and/or dogs for connecting the coupling elements or for connecting the coupling element, the toothing and/or dogs engaging into each other in a form-locking manner in order to establish a rotationally fixed connection, wherein a transmission of a power flow in a completely engaged condition takes place at least mainly by a positive engagement.

The shift elements can be designed, in principle, to be friction-locking or form-locking. The terms "axial" and "radial" are relative, in particular, to the main axis of rotation. As a result, in particular, an advantageous engageability/disengageabilty can be achieved. In particular, an electric or hybridized gear can be provided due to an appropriate engagement of the shift elements, wherein the efficiency of the hybrid transmission device can be increased due to a suitable combination of shift elements to form double shift units.

In addition, the hybrid transmission device can include a multi-speed transmission, which is operatively connected on the input side to the first transmission input shaft and on the output side to a countershaft of the gear reduction stage. Preferably, the first gear stage, including the first traction mechanism or the first intermediate gear, is connected between the first transmission input shaft and the transmission input of the multi-speed transmission, such that the axially parallel arrangement of the internal combustion engine with respect to the superposition gear unit and with respect to the gear reduction stage is achievable. Consequently, the internal combustion engine is at least indirectly connected to the transmission input of the multi-speed transmission. The multi-speed transmission is connected at the transmission output at least indirectly to the gear reduction stage, such that the drive power of the internal combustion engine can be transmitted directly onto the gear reduction stage. Simultaneously, the superposition gear unit is by-passed. Therefore, the multi-speed transmission can be designed having precisely one transmission input and precisely one transmission output, wherein the multi-speed transmission is preferably connected between the first transmission input shaft and the countershaft of the gear reduction stage. If a multi-speed transmission is not provided, the hybrid transmission device is to be understood as a single-speed transmission.

The multi-speed transmission is provided for realizing the drive of the motor vehicle in multiple gear steps with different gear ratios. The multi-speed transmission can have a clutch, which is designed for decoupling the multi-speed transmission from the drive train, in particular for decoupling two components of the transmission from each other, the two components of the transmission being drivingly connectable to each other. When it is necessary to drive the motor vehicle by the internal combustion engine, the drive power of the internal combustion engine is then guided into the superposition gear unit via the first gear stage due to an appropriate engagement of the shift elements and, thus, is not transmitted onto the gear reduction stage via the multi-speed transmission. By the multi-speed transmission, at least one further gear step is achievable, which implements a gear ratio that differs from the superposition gear unit.

Depending on which of the elements, ring gear or sun gear, of the superposition gear unit is operatively connectable to the internal combustion engine by the first shift element, the second transmission input shaft is operatively connected to the sun gear or to the ring gear of the first planetary gear set of the superposition gear unit at least via a second gear stage, including a second traction mechanism, and/or via at least a second intermediate gear. When the internal combustion engine is rotationally fixable to the sun gear of the first planetary gear set of the superposition gear unit via the first shift element, the second transmission input shaft is operatively connected to the ring gear of the first planetary gear set of the superposition gear unit at least via the second gear stage. For this purpose, the ring gear of the first planetary gear set includes, in this case, preferably a fixed gear that is rotationally fixed to the ring gear and is at least indirectly rotationally driveable by the second traction mechanism or the second intermediate gear. Alternatively, when the internal combustion engine is rotationally fixable to the ring gear of the first planetary gear set of the superposition gear unit via the first shift element, the second transmission input shaft is operatively connected to the sun gear of the first planetary gear set of the superposition gear unit at least via the second gear stage. For this purpose, the sun gear preferably includes a fixed gear that is rotationally fixed to the sun gear and is at least indirectly rotationally driveable by the second traction mechanism or the second intermediate gear. Consequently, a fixed ratio, in particular the second gear stage, is arranged in the power flow between the second transmission input shaft and the sun gear or the ring gear of the first planetary gear set of the superposition gear unit. The first electric machine is preferably inseparable from the drive train, i.e., is designed without a shift element arranged between the first electric machine and the drive train that can decouple the first electric machine from the output. The output preferably takes place in each of the aforementioned cases via the planet carrier of the first planetary gear set of the superposition gear unit. As a result, in particular, weight and installation space can be achieved due to increased flexibility and compactness.

A "planetary gear set" is, in particular, a unit that includes a sun gear, a ring gear, and multiple planet gears guided by a planet carrier on a circular path about the sun gear. Advantageously, the particular planetary gear set has precisely one stationary gear ratio.

The term "directly" is to be understood to mean a direct connection of the elements without an intermediate connection of engageable clutch elements and/or gearwheels or gear stages. The term "provided" is to be understood to mean, in particular, specifically designed and/or specifically equipped. The expression that an object is provided for a certain function is to be understood to mean, in particular, that the object fulfills and/or carries out this certain function in at least one application state and/or operating state.

A "transmission input shaft" is to be understood to be a transmission element that is provided, at least structurally, for the rotationally fixed connection to the drive unit, in particular to a crankshaft of the internal combustion engine and/or to a rotor of the particular electric machine. A "transmission element" is to be understood to be, in particular, an element that is provided for the permanent rotationally fixed connection between components of the transmission, in particular of gearwheels, shafts, and/or coupling elements.

Due to an appropriate example embodiment of the hybrid transmission device, a particularly compact design can be achieved and, in fact, in particular when the hybrid transmission device includes a gear reduction stage. Therefore, in particular, installation space between the internal combustion engine, the at least first electric machine, the superposition gear unit, and the differential can be optimally utilized.

The gear reduction stage includes, in addition to the two spur gear pairs, a countershaft that is rotatably mounted and is arranged in parallel to the first transmission input shaft, to the second transmission input shaft, to the differential, and to the superposition gear unit. The first spur gear pair has a first gearwheel arranged on the countershaft in a rotationally fixed manner and a second gearwheel meshed with the first gearwheel, wherein the second spur gear pair includes a third gearwheel, which is also arranged on the countershaft in a rotationally fixed manner and is spaced apart from the first gearwheel, and a fourth gearwheel meshed with the third gearwheel. Consequently, two gearwheels are arranged as fixed gears on the countershaft so as to be axially spaced apart. The second gearwheel, which is meshed with the first gearwheel, is operatively connected to the differential. The fourth gearwheel, which is meshed with the third gearwheel, is preferably at least indirectly operatively connected to the planet carrier of the superposition gear unit. In other words, the planet carrier of the superposition gear unit is operatively connected to the second spur gear pair of the gear reduction stage. Preferably, the planet carrier of the superposition gear unit is rotationally fixed to the fourth gearwheel of the second spur gear pair, wherein a (intermediate) shaft can be arranged between the planet carrier and the fourth gearwheel. Further preferably, the planet carrier of the superposition gear unit is permanently rotationally fixed to the fourth gearwheel of the second spur gear pair. The countershaft of the gear reduction stage is to be understood, in particular, as a transmission output shaft that combines or sums a drive power coming from the particular electric machine and/or the internal combustion engine and transmits this onto the differential.

The term "rotationally fixed" is to be understood to mean, in particular, a connection between two components, in which a power flow is transmitted across one complete revolution with, on average, an unchanged torque, an unchanged direction of rotation, and/or an unchanged rotational speed. A relative rotation of the components that are rotationally fixed to each other is blocked in a rotationally fixed connection. The expression "permanently rotationally fixed" is to be understood to mean, in particular, a permanent connection between two components that transmits rotational speed and torque, which are unchanged on average, across one complete revolution. As a result, in particular, an advantageously compact arrangement can be provided.

The second shift element, preferably in the engaged condition, is provided for connecting the ring gear or the sun gear of the first planetary gear set of the superposition gear unit to a housing. Depending on the point of connection of the internal combustion engine to the superposition gear unit, the ring gear or the sun gear of the superposition gear unit can be arranged so as to be fixed to the housing in the engaged condition of the second shift element. Advantageously, a low electric gear can be realized. Simultaneously, the first shift element is in the disengaged condition, such that a purely electric drive of the motor vehicle by the first electric motor is realized.

Preferably, the third shift element is configured for interlocking the first planetary gear set of the superposition gear unit. As a result, a second electric gear can be particularly advantageously achieved. Various interlock variants are implementable. The third shift element, in the engaged condition, can be provided for rotationally fixing, i.e., interlocking, the planet carrier with the ring gear, the planet carrier with the sun gear, or the ring gear with the sun gear. Depending on the engagement position of the first shift element, a hybridized drive or a purely electric drive can take place when the third shift element is engaged.

Preferably, two of the shift elements are combined to form a double shift unit. According to one exemplary embodiment, the first and the second shift elements are formed as a double shift unit, wherein the double shift unit is actuatable, in particular, by an actuator, as the result of which components, in particular actuators, installation space, weight, and costs can be saved.

Further preferably, at least two of the shift elements are arranged axially between the point of connection of the first transmission input shaft and the first planetary gear set of the superposition gear unit. A point of connection of the first transmission input shaft is to be understood, in particular, as a first gear stage designed as a fixed ratio between the first transmission input shaft and the ring gear or the sun gear of the superposition gear unit, the ring gear or the sun gear being arranged so as to be axially parallel to the first transmission input shaft, the first gear stage including the first traction mechanism or the at least first intermediate gear, wherein the first shift element is arranged between the first gear stage and the ring gear or the sun gear. The first traction mechanism or the at least first intermediate gear is provided for at least indirectly transmitting a drive power between the first transmission input shaft and the ring gear or the sun gear of the superposition gear unit, provided that the first shift element is engaged. A point of connection of the second transmission input shaft is to be understood, in particular, as a second gear stage designed as a fixed ratio between the second transmission input shaft and the ring gear or the sun gear of the superposition gear unit, the ring gear or the sun gear being arranged so as to be axially parallel to the second transmission input shaft, the second gear stage including the second traction mechanism or the at least second intermediate gear. The second traction mechanism or the at least second intermediate gear is provided for at least indirectly transmitting a drive power between the second transmission input shaft and the ring gear or the sun gear of the superposition gear unit. Alternatively, the point of connection of the first transmission input shaft is arranged axially between at least two of the shift elements and the first planetary gear set of the superposition gear unit. The axial order of the components of the hybrid transmission device along an output axis can be adapted in any way to the existing installation space and the requirements on the hybrid transmission device in order to realize an installation space-saving example embodiment of the hybrid transmission device.

The hybrid transmission device according to one exemplary embodiment preferably includes at least a third transmission input shaft for connecting a rotor of a second electric machine. The third transmission input shaft is operatively connected to the first transmission input shaft or is operatively connectable to the first transmission input shaft via a shift element designed as a separating clutch, which is configured for decoupling the hybrid transmission device from the internal combustion engine. The third transmission input shaft is preferably arranged so as to be axially parallel to the output axis, to the idler shaft, and to the particular axis of the first and the second transmission input shafts. In particular, the third transmission input shaft is operatively connectable to the first transmission input shaft via a shift element designed as a separating clutch, which is configured for decoupling the hybrid transmission device from the internal combustion engine. The third transmission input shaft is preferably arranged so as to be axially parallel to the output axis, to the idler shaft, and to the particular axis of the first and the second transmission input shafts.

The second electric machine, similarly to the internal combustion engine and/or to the first electric machine, can be connected to the output via a third gear stage, which is designed as a fixed ratio and includes a third traction mechanism or an at least third intermediate gear. Preferably, the second electric machine is connected to the first transmission input shaft via the third traction mechanism or at least the third intermediate gear. For this purpose, a fixed gear can be arranged at the first transmission input shaft, the fixed gear being operatively connected to the third traction mechanism or to the at least third intermediate gear. The second electric machine is preferably designed as a starter generator, in particular as an HV starter generator.

The separating clutch can be arranged between the connection of the second electric machine and the internal combustion engine and, in fact, such that the internal combustion engine is decouplable from the output and the second electric machine can be used simultaneously, also with the internal combustion engine deactivated or switched off, in particular with the first shift element engaged. Consequently, in this case, the first shift element, in the engaged condition, is provided for operatively connecting the ring gear or the sun gear of the first planetary gear set of the superposition gear unit to the second electric machine. According to one exemplary embodiment, the third transmission input shaft is operatively connected to the first transmission input shaft via the third traction mechanism or the at least third intermediate gear and, thereafter, to the first shift element via the first traction mechanism or the at least first intermediate gear.

The system is also operable, in principle, without a separating clutch, in particular when the hybrid transmission device has a multi-speed transmission that includes a clutch element having a neutral position. Nevertheless, an arrangement of a separating clutch in the device can be advantageous, in particular, for reasons of operational safety. Depending on the requirements, the separating clutch can be designed as a form-locking or friction-locking shift element.

Example aspects of invention provide a hybrid transmission device with a gear change transmission, which is arranged so as to be axially parallel to the first transmission input shaft. The gear change transmission includes at least a third spur gear pair and at least a fourth shift element for shifting the hybrid transmission device between at least two gear steps. Provided that a gear change transmission is provided, one or multiple internal combustion engine-driven, electric, or hybridized gear(s) can be realized. Simultaneously, the above-described multi-speed transmission can be dispensed with. By providing a fourth shift element, a two-speed transmission or a two-speed drive of the motor vehicle is achievable.

The gear change transmission can be arranged in the hybrid transmission device, in principle, in any way. In particular, the gear change transmission can be arranged coaxially to the countershaft of the gear reduction stage and, therefore, so as to be axially parallel to the output axis and to the first, the second, and the third transmission input shafts. Alternatively, the gear change transmission can be arranged coaxially to the output axis and, therefore, so as to be axially parallel to the axis of the countershaft and to the first, the second, and the third transmission input shafts.

The gear change transmission can be arranged in the power flow between the first transmission input shaft and the countershaft. A direct introduction of the drive power of the second electric machine and, if necessary, of the internal combustion engine onto the gear reduction stage takes place by switching the fourth shift element from a disengaged condition into an engaged condition with the first shift element simultaneously disengaged. The superposition gear unit can be by-passed. A second gear ratio is establishable by the gear change transmission, the second gear ratio differing from the first gear ratio of the superposition gear unit. A fifth gearwheel of the third spur gear pair designed as a fixed gear can be rotationally fixed to a hollow shaft or intermediate shaft operatively connected to the first shift element, the fifth gearwheel therefore being arranged coaxially to the output axis. The fifth gearwheel can be meshed with a sixth gearwheel of the third spur gear pair arranged coaxially to the countershaft, the sixth gearwheel being operatively connected to the fourth shift element. A rotationally fixed connection is formed between the sixth gearwheel and the countershaft of the gear reduction stage by engaging the fourth shift element.

A first gear step is present, for example, when the fourth shift element is disengaged and the first shift element is engaged. Simultaneously, the third shift element is also engaged. A second gear step is present, for example, when the fourth shift element is engaged and the first shift element is disengaged, while the third shift element is engaged. During a gear change operation between the two gear steps, the first electric machine can transmit a drive power via the superposition gear unit onto the gear reduction stage, such that a tractive force is maintained at the transmission output during a gear change operation between two gear steps. Consequently, a drive output-supported powershift can be realized by appropriate open-loop control of the first electric machine. The two gear steps differ in terms of a different gear ratio at the transmission output. In particular, the second gear or the second gear step, i.e., when the fourth shift element is engaged, is lower than the first gear or the first gear step when the first shift element is engaged.

According to one exemplary embodiment, the gear change transmission has a fifth shift element for shifting the hybrid transmission device between at least three gear steps. By providing a fifth shift element, a three-speed transmission or a three-speed drive of the motor vehicle is achievable. Preferably, the gear change transmission has a fourth spur gear pair. A second gear reduction stage can be realized by combining the third and the fourth spur gear pairs. The fourth shift element, in an engaged condition, can rotationally fix the gearwheel of the third or the fourth spur gear pair to an element of the superposition gear unit, in particular to the ring gear or to the sun gear of the first planetary gear set of the superposition gear unit, or to the gear reduction stage. The fifth shift element can be arranged separately in the hybrid transmission device. Alternatively, the fifth shift element can be formed together with the fourth shift element as a double shift unit, wherein this double shift unit is actuatable, in particular, by a separate actuator, as the result of which components, in particular actuators, installation space, weight, and costs can be saved. Preferably, the fifth shift element is arranged coaxially to the countershaft and, in the engaged condition, realizes a third gear step having a third gear ratio, in particular when the first and the fourth shift elements are simultaneously disengaged. Moreover, the above-described second gear reduction stage can be supplemented with the fifth shift element.

At least one, preferably multiple, particularly preferably all shift element(s) of the hybrid transmission device is/are designed to be form-locking. The components to be coupled to each other by form-locking shift elements are synchronized with each other during the engagement of the particular shift element. This is carried out, in particular, by the internal combustion engine and/or the second electric machine. Alternatively, a friction-locking design of one, multiple, or all shift element(s) is conceivable.

When the particular traction mechanism of the hybrid transmission device is a wrap-around mechanism, such as, for example, a chain or a toothed belt, in particular, weight and installation space can be saved while, simultaneously, flexibility is increased. The particular traction mechanism can be provided for drivingly connecting the first transmission input shaft, preferably the internal combustion engine operatively connected to the first transmission input shaft, to the superposition gear unit or to the gear reduction stage and/or drivingly connecting the second transmission input shaft, preferably the first electric machine operatively connected to the second transmission input shaft, to the superposition gear unit and/or drivingly connecting the third transmission input shaft, preferably the second electric machine operatively connected to the third transmission input shaft, to the superposition gear unit. The transmission input is preferably a hollow shaft, which is operatively connected to the first shift element. Fixed gears or idler gears can be arranged at this hollow shaft, the fixed gears or idler gears being designed, for example, for connecting the second countershaft or for operatively connecting to the fourth and/or the fifth shift element(s), the second axle shaft of the differential being guided through the hollow shaft. For the connection of the particular electric machine, in particular, various connections appearing reasonable to a person skilled in the art are conceivable, such as, for example, a coaxial connection directly on the shaft, an axially parallel connection via a gear train, an axially parallel connection via a chain, or an axially parallel connection via belts.

The hybrid transmission device according to the above-described type can be used in a motor vehicle, wherein the motor vehicle includes an internal combustion engine and at least a first electric machine, preferably also a second electric machine. The internal combustion engine is arranged so as to be axially parallel to the particular electric machine and to the particular output axis. The motor vehicle is, therefore, a vehicle that is drivable in a hybrid manner and is drivable either purely electrically by the first electric machine or in combination with an internal combustion engine in a hybrid drive. Preferably, the hybrid transmission device is arranged transversely to the vehicle longitudinal axis and to the vehicle longitudinal direction, such that the wheels of an axle of the vehicle can be at least indirectly arranged at the ends of the axle shafts of the differential. The motor vehicle is, in particular, an automobile (for example, a passenger car having a weight of less than 3.5 t), a bus, or a truck (bus and truck, for example, having a weight of over 3.5 t). The hybrid transmission device according to example aspects of the invention is operatively arranged at least at one of the axles of the motor vehicle, wherein the wheels of this axle are drivable according to the comments presented above. It is conceivable that multiple or all axles of the motor vehicle have a particular hybrid transmission device according to the above-described type.

The definitions presented above and comments presented regarding technical effects, advantages, and advantageous embodiments of the hybrid transmission device according to example aspects of the invention also apply similarly for the motor vehicle according to example aspects of the invention, and vice versa. It is understood that features of the approaches presented above and/or described in the claims and/or figures may also be combined in order to be able to implement, cumulatively, the advantages and effects achievable in the present case.

BRIEF DESCRIPTION OF THE DRAWINGS

Example embodiments of the invention are explained in greater detail in the following with reference to the schematic drawings, wherein identical or similar elements are labeled with the same reference character, wherein.

DETAILED DESCRIPTION

Figure 1:
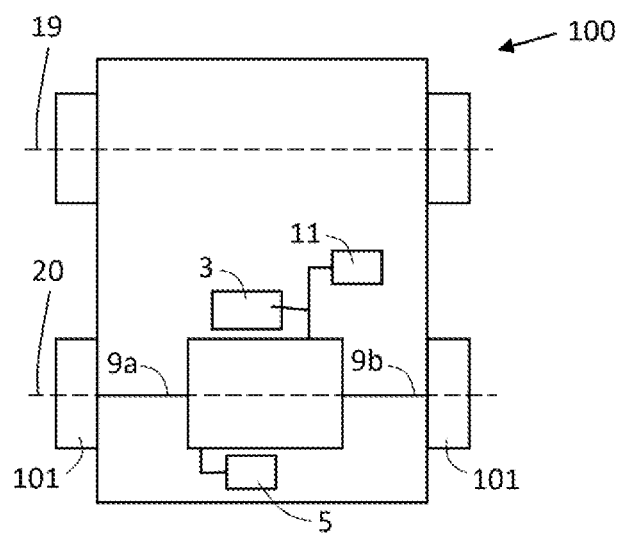
FIG. 1 shows a motor vehicle that includes a hybrid transmission device according to example aspects of the invention, according to a first embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 2 through FIG. 13 each show a hybrid drive system that includes a hybrid transmission device 1 in different example embodiments. In FIG. 1, the hybrid transmission device 1 is shown installed in a motor vehicle 100 in a highly simplified manner.

FIG. 1 shows the motor vehicle 100 that includes a first axis 19 and a second axis 20. Axle shafts 9a, 9b of a differential 8 of the hybrid transmission device 1 are coaxially arranged on the second axis 20 and, starting from the hybrid transmission device 1, extend in opposite directions to wheels 101 of the motor vehicle 100, which are operatively connected to the axle shafts 9a, 9b. The differential splits a drive power onto the two axle shafts 9a, 9b, such that the wheels 101 operatively connected to the axle shafts 9a, 9b are driveable. The axle shafts 9a, 9b of the differential 8 form the output of the hybrid transmission device 1. The axle shafts 9a, 9b are connected downstream from the differential 8. The differential 8 is provided for a speed compensation between the wheels 101 of the motor vehicle 100. The hybrid transmission device 1, together with an internal combustion engine 2 and two electric machines 5, 11, forms a drive train or a portion of the drive train of the motor vehicle 100. Hybrid transmission devices 1 that enable a front-mounted transverse installation of the hybrid transmission device 1 in the motor vehicle 100 are presented in the following. By the internal combustion engine 3 and the two electric machines 5, 11, which are operatively connected to transmission parts (described in the following) of the hybrid transmission device 1, in particular, an electrodynamic driving-off mode and either a purely electric or hybridized or internal combustion engine-driven mode of the motor vehicle 100 are realized. The differential 8 is the differential of the front axle of the motor vehicle 100, wherein the differential 8 also on the first axis 19 can be the differential of the rear axle of the motor vehicle 100.

Figure 2:
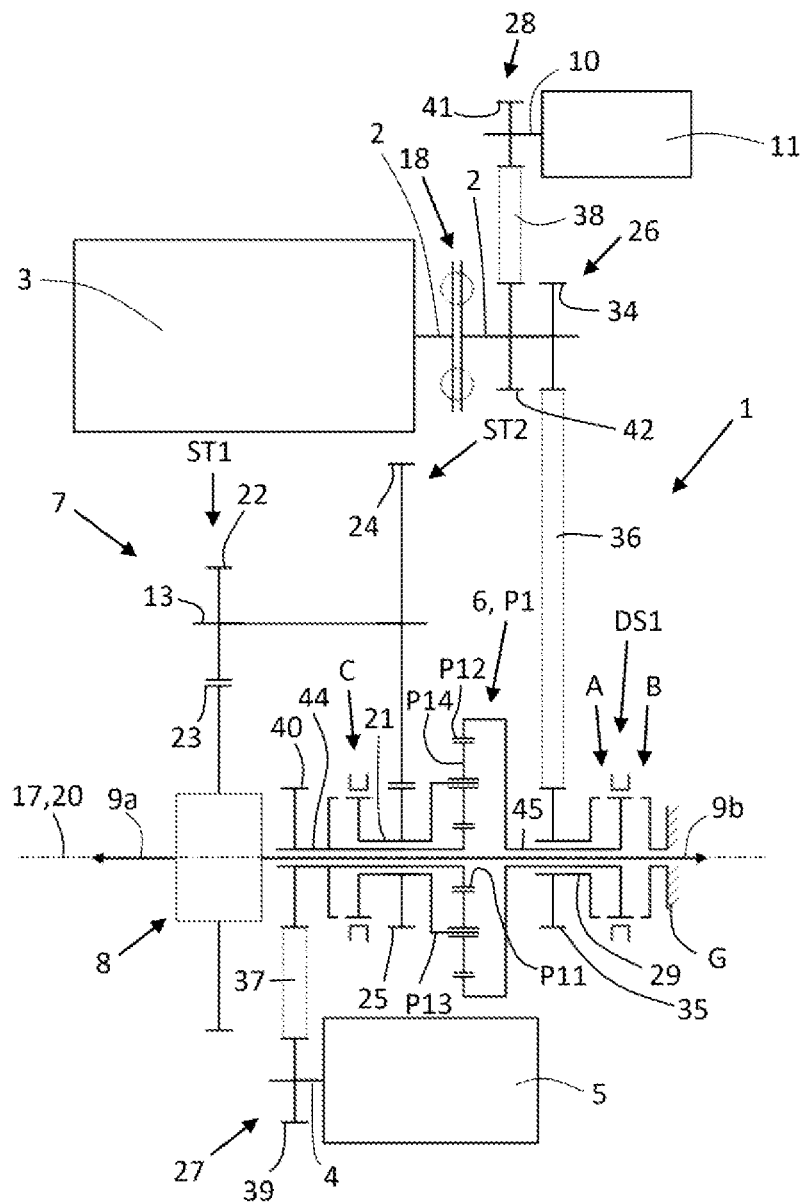
FIG. 2 shows a hybrid transmission device according to FIG. 1.

According to FIG. 2, which is an exemplary representation of a basic example variant of the hybrid transmission device 1, a first transmission input shaft 2 operatively connected to the internal combustion engine 3, a second transmission input shaft 4 operatively connected to the first electric machine 5, and a third transmission input shaft 10 operatively connected to the second electric machine 11 are each arranged so as to be axially parallel to an output axis 17 of the hybrid transmission device 1. The output axis 17 is arranged essentially coaxially to the second axis 20 according to FIG. 1. Each electric machine 5, 11 includes a stator and a rotor (neither of which is visible), wherein the rotor is rotationally fixed to the second and the third transmission input shaft 4, 10, respectively. The first transmission input shaft 2 is split in the present case, wherein a device 18 that is typical for internal combustion engines for decoupling non-uniformity of rotation, which is designed in the present case, for example, as a torsional vibration damper, is arranged between the two portions of the first transmission input shaft 2. These two portions are referred to jointly in the following as the first transmission input shaft 2. The second electric machine 11 is designed as an HV starter generator in the present case.

The hybrid transmission device 1 also includes a superposition gear unit 6, which is arranged coaxially to the output axis 17 and, therefore, so as to be axially parallel to the first transmission input shaft 2, to the second transmission input shaft 4, and to the third transmission input shaft 10. The superposition gear unit 6 includes, in the present case, a first planetary gear set P1, which has a sun gear P11, a ring gear P12, and a planet carrier P13 that includes planet gears P14 rotatably arranged on the planet carrier P13. Moreover, the first transmission input shaft 2, the second transmission input shaft 4, and the third transmission input shaft 10 are arranged so as to be axially parallel to one another. The superposition gear unit 6 is designed to be drivingly connected to the first electric machine 5 and to the second electric machine 11 and to connect the internal combustion engine 3 in a situation-dependent manner.

In addition, the hybrid transmission device 1 has a gear reduction stage 7 that includes a countershaft 13 arranged so as to be axially parallel to the three transmission input shafts 2, 4, 10 and to the output axis 17. The countershaft 13 is operatively connected to a first spur gear pair ST1 and to a second spur gear pair ST2 of the gear reduction stage 7. In fact, the first spur gear pair ST1 has a first gearwheel 22, which is arranged as a fixed gear at the countershaft 13 in a rotationally fixed manner. The first gearwheel 22 is meshed with a second gearwheel 23, which is operatively connected to the differential 8. Similarly, a third gearwheel 24 is arranged as a fixed gear at the countershaft 13 and is meshed with a fourth gearwheel 25 designed as a fixed gear. The fourth gearwheel 25 is rotationally fixed to the planet carrier P13 via a first shaft 21 designed as a hollow shaft. The output of the superposition gear unit 6 takes place here via the planet carrier P13, which is permanently rotationally fixed to the first shaft 21 and to the fourth gearwheel 25 of the gear reduction stage 7. The planet carrier P13 is therefore operatively connected, as the transmission output of the superposition gear unit 6, via the gear reduction stage 7 and the differential 8 to the output of the hybrid transmission device 1. The first shaft 21 functions as a hollow output shaft of the superposition gear unit 6. The second axle shaft 9b of the differential 8 extends, in the opposite direction of the first axle shaft 9a, axially through the hybrid transmission device 1, in particular through the superposition gear unit 6 and the first shaft 21.

Moreover, the hybrid transmission device 1 has at least three shift elements. In the present example, this is precisely three, specifically a first shift element A, a second shift element B, and a third shift element C, wherein an electrodynamic driving-off process and a purely electric drive or a hybridized drive of the motor vehicle 100 are achievable due to an appropriate switch of the shift elements A, B, C between a first engagement condition, in particular a disengaged condition, and a second engagement condition, in particular an engaged condition. This is explained in detail in the following. The three shift elements A, B, C are designed as form-locking shift elements in the present case. The shift elements A, B, C are provided for shifting and/or interlocking the superposition gear unit 6, for implementing an electrodynamic driving-off mode, and for switching between a purely electric drive and a hybridized drive.

The particular shift element A, B, C is provided, in an engaged condition, for establishing a rotationally fixed connection between two coupling elements. In a disengaged condition or in a neutral position, the particular shift element A, B, C is provided for releasing the first coupling element in relation to the second coupling element. In the present case, the shift elements A, B, C are form-locking shift elements, wherein a synchronization of the parts in the hybrid transmission device 1 to be coupled to each other is carried out via the third electric machine 11 and/or the internal combustion engine 3. Another example embodiment of the particular shift element or of the synchronization of the coupling elements appearing reasonable to a person skilled in the art would also be conceivable, however.

The hybrid transmission device 1 is arranged behind the internal combustion engine 3 along the drive train, in particular along a power flow of the drive train. The hybrid transmission device 1 according to FIG. 2 through FIG. 9 is a single-speed hybrid transmission with one purely electric forward gear and one purely electric reverse gear. In addition, the internal combustion engine 3 can be used for the internal combustion engine-based or hybridized drive of the motor vehicle 100.

The first transmission input shaft 2 is connected via a first gear stage 26 designed as a flexible traction drive mechanism and is arranged at the superposition gear unit 6 on the transmission input side. The first transmission input shaft 2 is provided for introducing a drive torque output by the internal combustion engine 3 into the hybrid transmission device 1. The first gear stage 26 has a first traction mechanism 36, which is designed as a chain in the present case and operatively connects the first transmission input shaft 2 at least indirectly to a second shaft 29. The second shaft 29 in turn is operatively connected to the first shift element A. The first traction mechanism 36, similarly to all other traction mechanisms mentioned here, can be a toothed belt, or the like. A ninth gearwheel 34 is arranged as a permanently rotationally fixed gear at the first transmission input shaft 2. A tenth gearwheel 35 is arranged as a permanently rotationally fixed gear at the second shaft 29. The ninth and the tenth gearwheels 34, 35 are part of the first gear stage 26. The first traction mechanism 36 transmits the output torque between the ninth gearwheel 34 and the tenth gearwheel 35. When the first shift element A is engaged, the first transmission input shaft 2 introduces a drive torque output by the internal combustion engine 3 via the first gear stage 26, the second shaft 29, and the first shift element A into the superposition gear unit 6 of the hybrid transmission device 1. The first shift element A is operatively connected in the present case to the first gear stage 26 and to the ring gear P12 of the superposition gear unit 6.

The second transmission input shaft 4 for the direct connection of a rotor of the first electric machine 5 is connected via a second gear stage 27, which is designed as a flexible traction drive mechanism and is similarly arranged at the superposition gear unit 6 on the transmission input side. The second transmission input shaft 4 is provided for introducing a drive torque output by the first electric machine 5 into the hybrid transmission device 1, in particular into the superposition gear unit 6. The second gear stage 27 has a second traction mechanism 37, which is designed as a chain and operatively connects the second transmission input shaft 4 to the third shaft 44. An eleventh gearwheel 39 is arranged as a permanently rotationally fixed gear at the second transmission input shaft 4. A twelfth gearwheel 40 is arranged as a permanently rotationally fixed gear at the third shaft 44. The eleventh and the twelfth gearwheels 39, 40 are part of the second gear stage 27. The second traction mechanism 37 transmits the output torque between the eleventh gearwheel 39 and the twelfth gearwheel 40. The third shaft 44 is rotationally fixed to the sun gear P11 of the superposition gear unit 6 in the present case. Therefore, the drive torque generated by the first electric machine 5 is introduced into the superposition gear unit 6 via the second transmission input shaft 4, the second gear stage 27, and the third shaft 44.

The third transmission input shaft 10 for the direct connection of a rotor of the second electric machine 11 is connected via a third gear stage 28, which is designed as a flexible traction drive mechanism and is similarly arranged at the superposition gear unit 6 on the transmission input side. The third transmission input shaft 10 is provided for introducing a drive torque output by the second electric machine 11 into the hybrid transmission device 1, in particular into the superposition gear unit 6 of the hybrid transmission device 1. The third gear stage 28 has a third traction mechanism 38, which is designed as a chain and operatively connects the third transmission input shaft 10 to the first transmission input shaft 2. A thirteenth gearwheel 41 is arranged as a permanently rotationally fixed gear at the third transmission input shaft 10. A fourteenth gearwheel 42 is arranged as a permanently rotationally fixed gear at the first transmission input shaft 2. The thirteenth and the fourteenth gearwheels 41, 42 are part of the third gear stage 28. The third traction mechanism 38 transmits the output torque between the thirteenth gearwheel 41 and the fourteenth gearwheel 42. Therefore, a drive torque generated by the third electric machine 11 is introduced into the superposition gear unit 6 via the third transmission input shaft 10, the third gear stage 28, the first transmission input shaft 2, the first gear stage 26, the second shaft 29, and the first shift element A.

The transmission input shafts 2, 4, 10 are each designed as a solid shaft in the present case. In principle, however, another arrangement and design of the transmission input shafts 2, 4, 10 appearing reasonable to a person skilled in the art are also conceivable.

The first shift element A, in the engaged condition, is provided for rotationally fixing the ring gear P12 of the first planetary gear set P1 of the superposition gear unit 6 to the second shaft 29 and, therefore, establishing an operative connection between the internal combustion engine 3 or the second electric machine 11 and the superposition gear unit 6. In the present case, a fifth shaft 45 is arranged between the first shift element A and the ring gear P12. The fifth shaft 45 is used as an intermediate shaft and is arranged in the power flow between the first shift element A and the transmission input of the superposition gear unit 6, in the present case the ring gear P12 of the superposition gear unit 6.

By comparison, the second shift element B, in the engaged condition, is provided for rotationally fixing the ring gear P12 of the first planetary gear set P1 of the superposition gear unit 6 to a housing G of the hybrid transmission device 1 via the fifth shaft 45. In addition, the third shift element C is configured for interlocking the first planetary gear set P1 of the superposition gear unit 6. In this exemplary embodiment, the planet carrier P13 is interlocked with or rotationally fixed to the sun gear P11 of the superposition gear unit 6. The second shift element B and the third shift element C are operatively arranged within a gear set formed by the planetary gear set P1. The shift elements B, C are therefore provided for establishing different operative connections between the planetary gear set P1 and/or the housing G.

The housing G is formed by a transmission housing and accommodates the superposition gear unit 6, the shift elements A, B, C, and the gear reduction stage 7. Moreover, the differential 8, the internal combustion engine 3, the first electric machine 5, and/or the second electric machine 11 can also be accommodated in the housing G.

The first and the second shift elements A, B are combined to form a double shift unit DS1 in the present case. It would also be conceivable, however, to form the first and the second shift elements A, B as two individual shift elements. The first gear stage 26 is arranged axially between the double shift unit DS1 and the superposition gear unit 6 in this case. Consequently, the point of connection of the first transmission input shaft 2, i.e., the first gear stage 26, is arranged axially between the double shift unit DS1 and the first planetary gear set P1 of the superposition gear unit 6. According to an axial order along the output axis 17 within the hybrid transmission device 1, the arrangement is, initially, the differential 8 with the first spur gear pair ST1 of the gear reduction stage 7, axially adjacent thereto the point of connection of the second transmission input shaft 4, i.e., the second gear stage 27, axially adjacent thereto the third shift element C, axially adjacent thereto the second spur gear pair ST2 of the gear reduction stage 7, axially adjacent thereto the first planetary gear set P1 of the superposition gear unit 6, axially adjacent thereto the point of connection of the first transmission input shaft 2, i.e., the first gear stage 26, axially adjacent thereto the first shift element A, and axially adjacent thereto the second shift element B.

An internal combustion engine-based and a hybridized drive is present when the first shift element A and the third shift element C are engaged. The motor vehicle is operated by the internal combustion engine when the two electric machines 5 and 11 are controlled by an open-loop system in a load-free manner, while the internal combustion engine 3 transmits a drive power onto the output of the hybrid transmission device 1. The drive is hybridized when, in particular, the first electric machine 5 is actuated such that the first electric machine 5 and/or the second electric machine 11 each or jointly generate(s) a drive power, the drive power(s) being superposed with the drive power of the internal combustion engine 3 in the superposition gear unit 6.

The hybrid drive device 1 is designed, in this case, for shifting two purely electric gear steps, wherein the first gear step implements reverse travel of the motor vehicle 100 and the second gear step implements forward travel of the motor vehicle 100 in an electrodynamic driving-off mode. In the first purely electric driving mode, the second shift element B is engaged. The first purely electric driving mode can be used, for example, for a driving operation of the motor vehicle 100 in reverse, since a lower ratio is present in this case and an electrodynamic driving-off mode is not available. In a second purely electric driving mode, the third shift element C is engaged. The second purely electric driving mode can be used in this case for forward travel of the motor vehicle 100 in an electrodynamic driving-off mode, wherein a higher ratio is present in forward travel. It is advantageous that, as viewed from the first electric machine 5, the reverse travel and the forward travel are always implemented with a ratio that is as high as possible. If both the second shift element B and the third shift element C are disengaged, an electrodynamic driving-off mode can be implemented with the first shift element A disengaged. The internal combustion engine 3 is operatively connected to the ring gear P12 of the planetary gear set P1, wherein the first electric machine 5 supports the drive torque of the internal combustion engine 3 at the sun gear P11 operatively connected thereto and the output can take place via the planet carrier P13 onto the gear reduction stage 7.

Further exemplary embodiments of the invention are shown in FIG. 3 through FIG. 13. The following descriptions are limited essentially to the differences between the exemplary embodiments, wherein reference is made to the description of the other exemplary embodiments with respect to components, features, and functions that remain the same. The exemplary embodiments of FIG. 3 through FIG. 13 differ from the exemplary embodiment of FIG. 2 essentially in terms of the design of the hybrid drive device 1, in particular in terms of the arrangement of the components with respect to one another.

Figure 3:
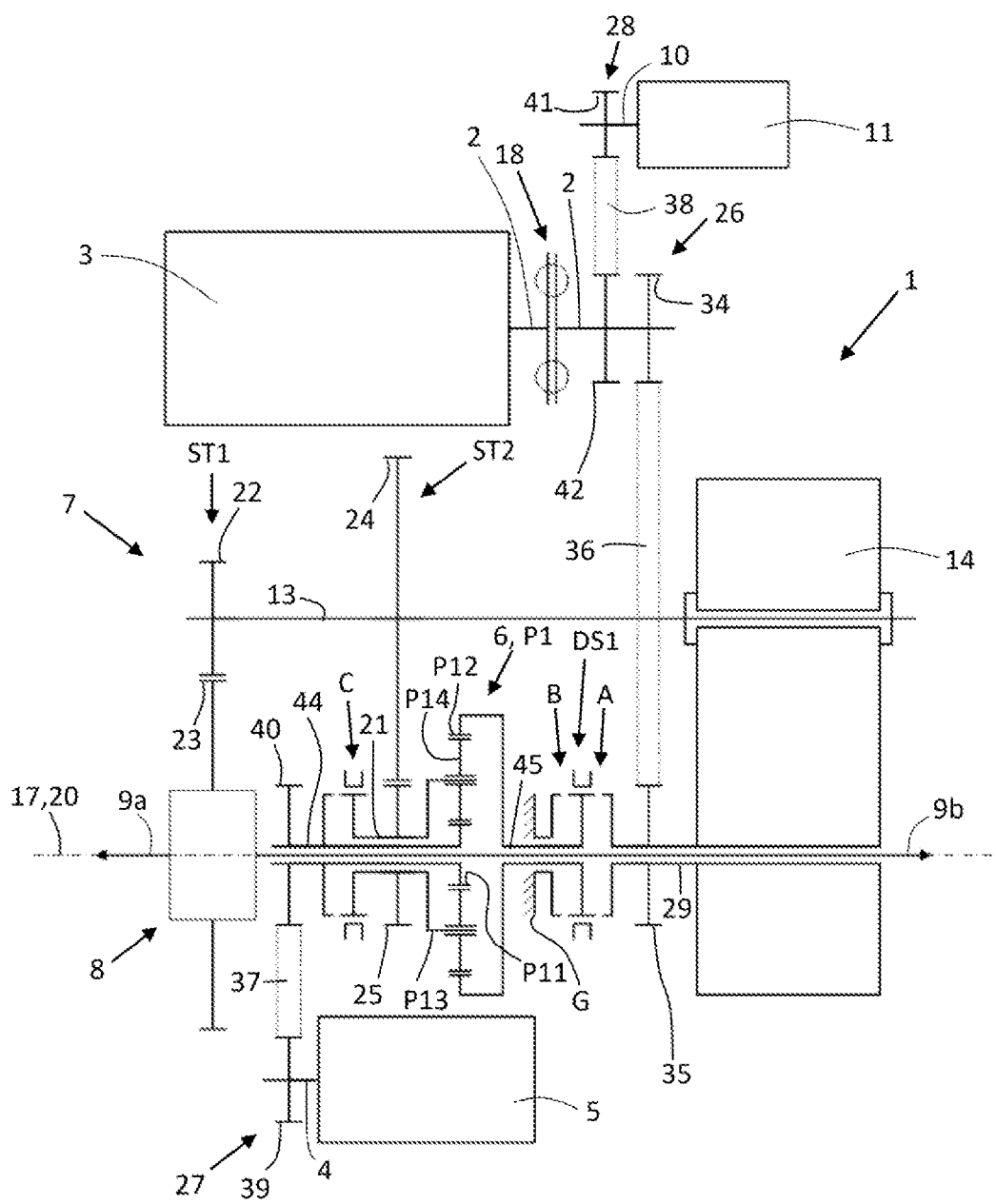
FIG. 3 shows a hybrid transmission device according to a second example embodiment.

FIG. 3 shows, proceeding from FIG. 2, an alternative basic example variant of the hybrid transmission device 1 according to a second embodiment. The hybrid transmission device 1 in this case has an additional multi-speed transmission 14, which is operatively connected on the input side to the first transmission input shaft 2 and on the output side to the countershaft 13 of the gear reduction stage 7. Multiple forward travel gear steps can be implemented due to the multi-speed transmission 14. The multi-speed transmission 14 is operatively connected to the second shaft 29, which is rotationally fixed to the tenth gearwheel 35 of the first gear stage 26 and to the first shift element A. The multi-speed transmission 14 has multiple spur gear stages and shift elements for implementing gears. It is merely to be made clear here that a multi-speed transmission 14 can also be integrated in the drive train and that, depending on the operating state, can establish a gear ratio and transmit the gear ratio directly onto the gear reduction stage 7. The superposition gear unit 6 can be by-passed with the first shift element A disengaged. The multi-speed transmission 14 advantageously has a neutral position, which is implementable by a clutch and in which no drive power of the internal combustion engine 3 is transmitted onto the gear reduction stage 7 and purely electric driving is possible by the first electric machine 5, in particular with the first shift element A engaged.

In this exemplary embodiment as well, the first and the second shift elements A, B are combined to form a first double shift unit DS1. In this case, however, the first gear stage 26 is arranged axially between the double shift unit DS1 and the multi-speed transmission 14. Consequently, the point of connection of the first transmission input shaft 2, i.e., the first gear stage 26, is arranged axially between the double shift unit DS1 and the multi-speed transmission 14. In other words, the shift elements A and B are arranged axially between the point of connection of the first gear stage 26 and the first planetary gear set P1 of the superposition gear unit 6. According to an axial order along the output axis 17 within the hybrid transmission device 1, the arrangement is, therefore, initially, the differential 8 with the first spur gear pair ST1 of the gear reduction stage 7, axially adjacent thereto the point of connection of the second transmission input shaft 4, i.e., the second gear stage 27, axially adjacent thereto the third shift element C, axially adjacent thereto the second spur gear pair ST2 of the gear reduction stage 7, axially adjacent thereto the first planetary gear set P1 of the superposition gear unit 6, axially adjacent thereto the second shift element B, axially adjacent thereto the first shift element A, axially adjacent thereto the point of connection of the first transmission input shaft 2, i.e., the first gear stage 26, and axially adjacent thereto the multi-speed transmission 14.

Figure 4:
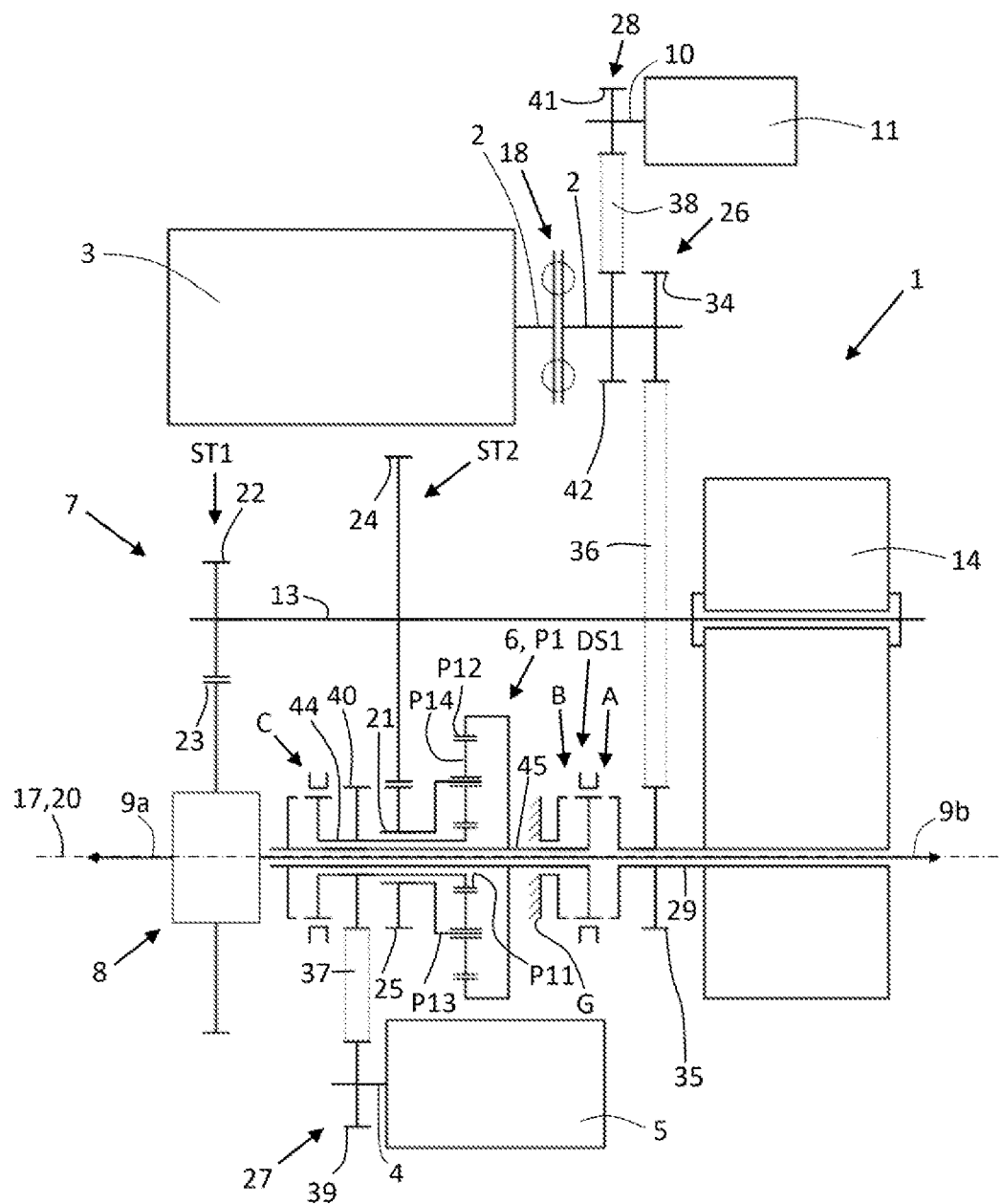
FIG. 4 shows a hybrid transmission device according to a third example embodiment.
Figure 5:
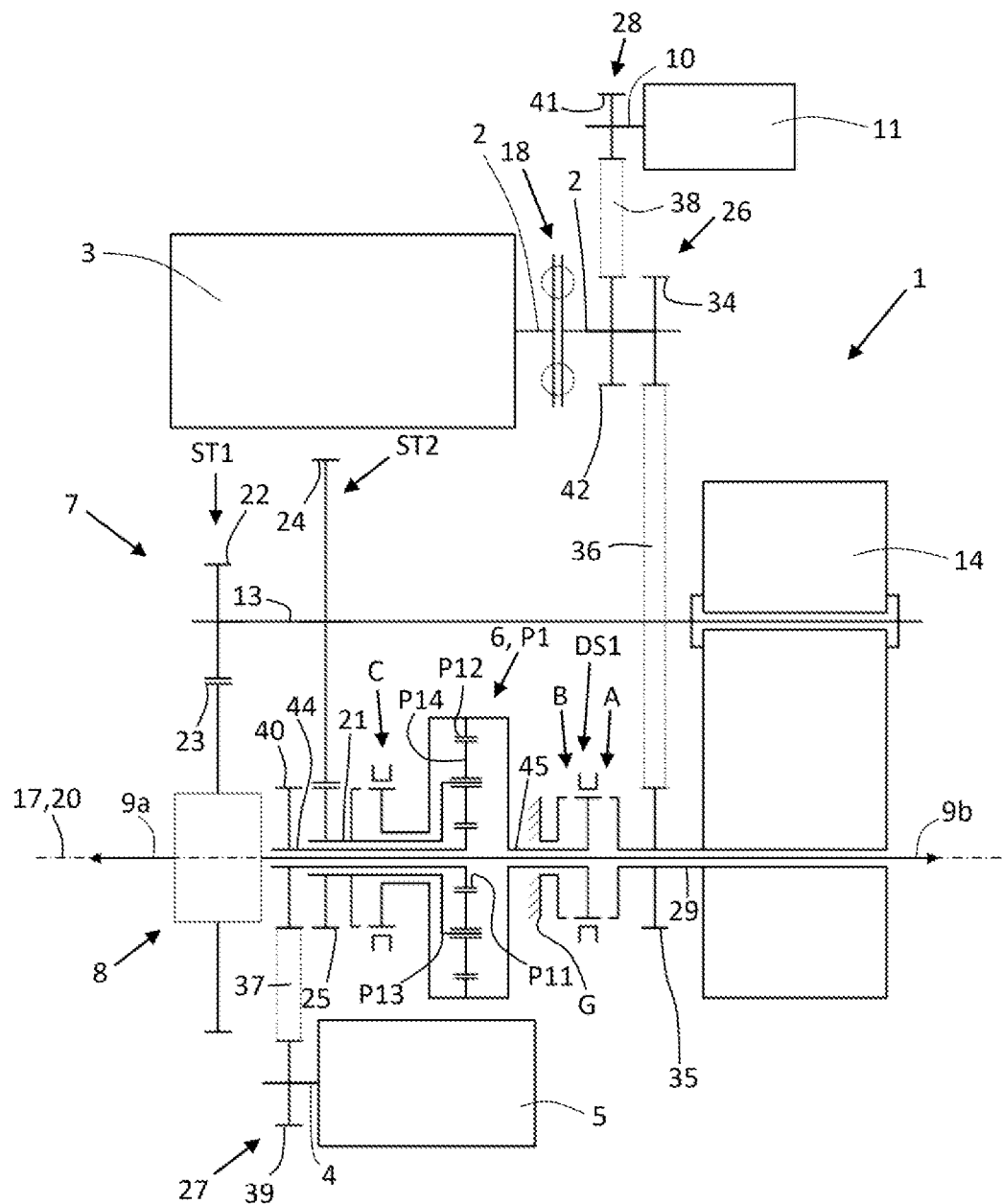
FIG. 5 shows a hybrid transmission device according to a fourth example embodiment.

FIG. 4 and FIG. 5 show two interlock example variants of the superposition gear unit 6, which are alternatives to the example embodiment according to FIG. 3 and are realized using the third shift element C. Whereas in FIG. 2 and also in FIG. 3, in the engaged condition of the third shift element C, the sun gear P11 and the planet carrier P13 are interlocked with each other, i.e., connected to each other in a rotationally fixed manner, FIG. 4 shows that the third shift element C in the engaged condition rotationally fixes the sun gear P11 via the third shaft 44 to the ring gear P12 and to the fourth shaft 45. In FIG. 5, the third shift element C in the engaged condition connects the planet carrier P13 to the ring gear P12 in a rotationally fixed manner. The axial order of the components of the hybrid drive device 1 is adapted to the appropriate conditions. For the rest, the transmission input as well as the transmission output of the superposition gear unit 6, in particular points of connection of the internal combustion engine 3 and of the first electric machine 5 to the superposition gear unit 6, are identical to FIG. 2 and to FIG. 3.

Figure 6:
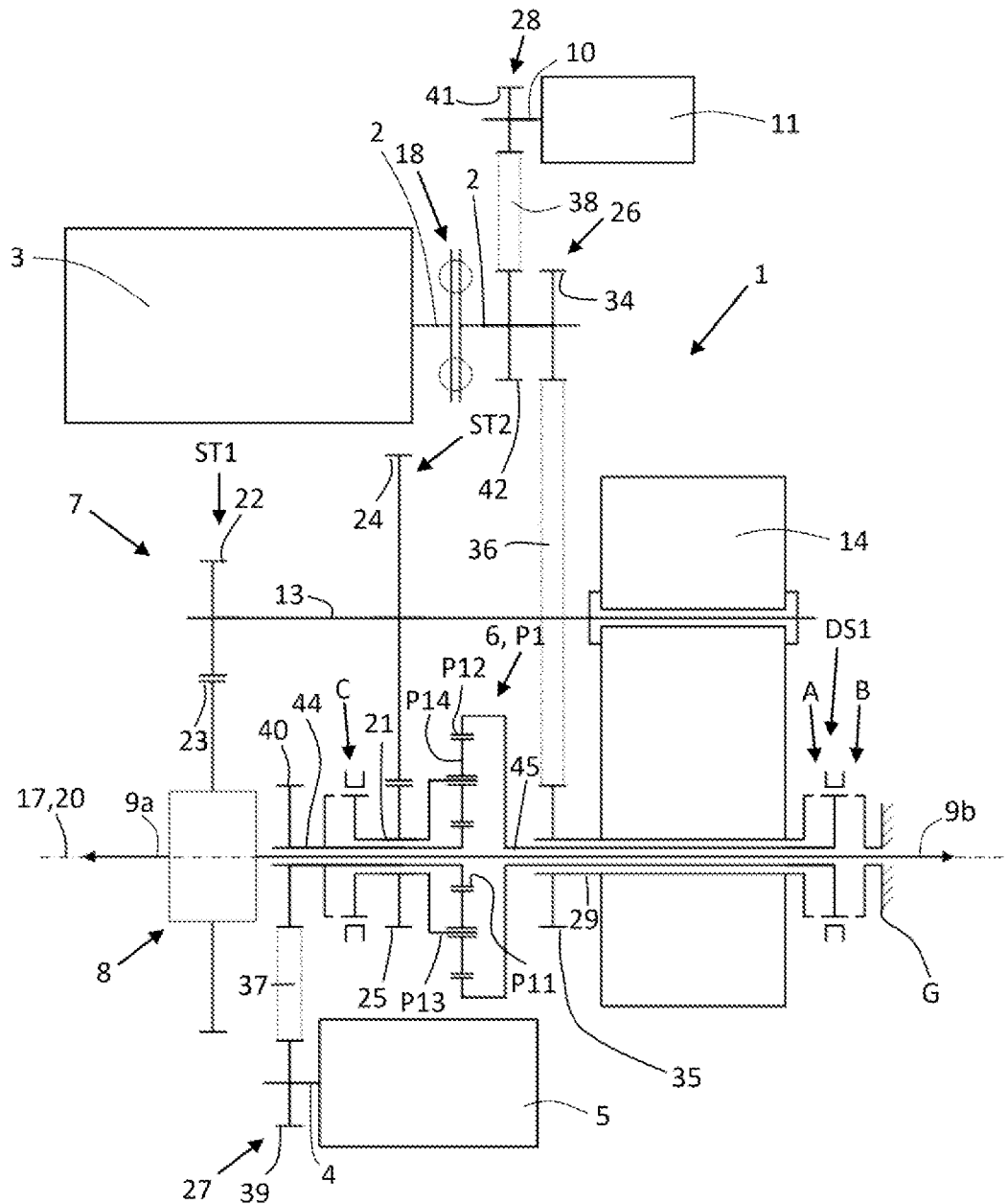
FIG. 6 shows a hybrid transmission device according to a fifth example embodiment.

FIG. 6 shows a combination of the exemplary embodiments according to FIG. 2 and FIG. 3. FIG. 6 shows an alternative example arrangement of the components along the output axis 17. In the present case, the double shift unit DS1 is arranged at the opposite end with respect to the differential 8. The first gear stage 26 is arranged axially between the superposition gear unit 6 and the multi-speed transmission 14. Consequently, the point of connection of the first transmission input shaft 2, i.e., the first gear stage 26, is arranged axially between the multi-speed transmission 14 and the first planetary gear set P1 of the superposition gear unit 6. According to an axial order along the output axis 17 within the hybrid transmission device 1, the arrangement is, therefore, initially, the differential 8 with the first spur gear pair ST1 of the gear reduction stage 7, axially adjacent thereto the point of connection of the second transmission input shaft 4, i.e., the second gear stage 27, axially adjacent thereto the third shift element C, axially adjacent thereto the second spur gear pair ST2 of the gear reduction stage 7, axially adjacent thereto the first planetary gear set P1 of the superposition gear unit 6, axially adjacent thereto the point of connection of the first transmission input shaft 2, i.e., the first gear stage 26, axially adjacent thereto the multi-speed transmission 14, axially adjacent thereto the first shift element A, and axially adjacent thereto the second shift element B.

Figure 7:
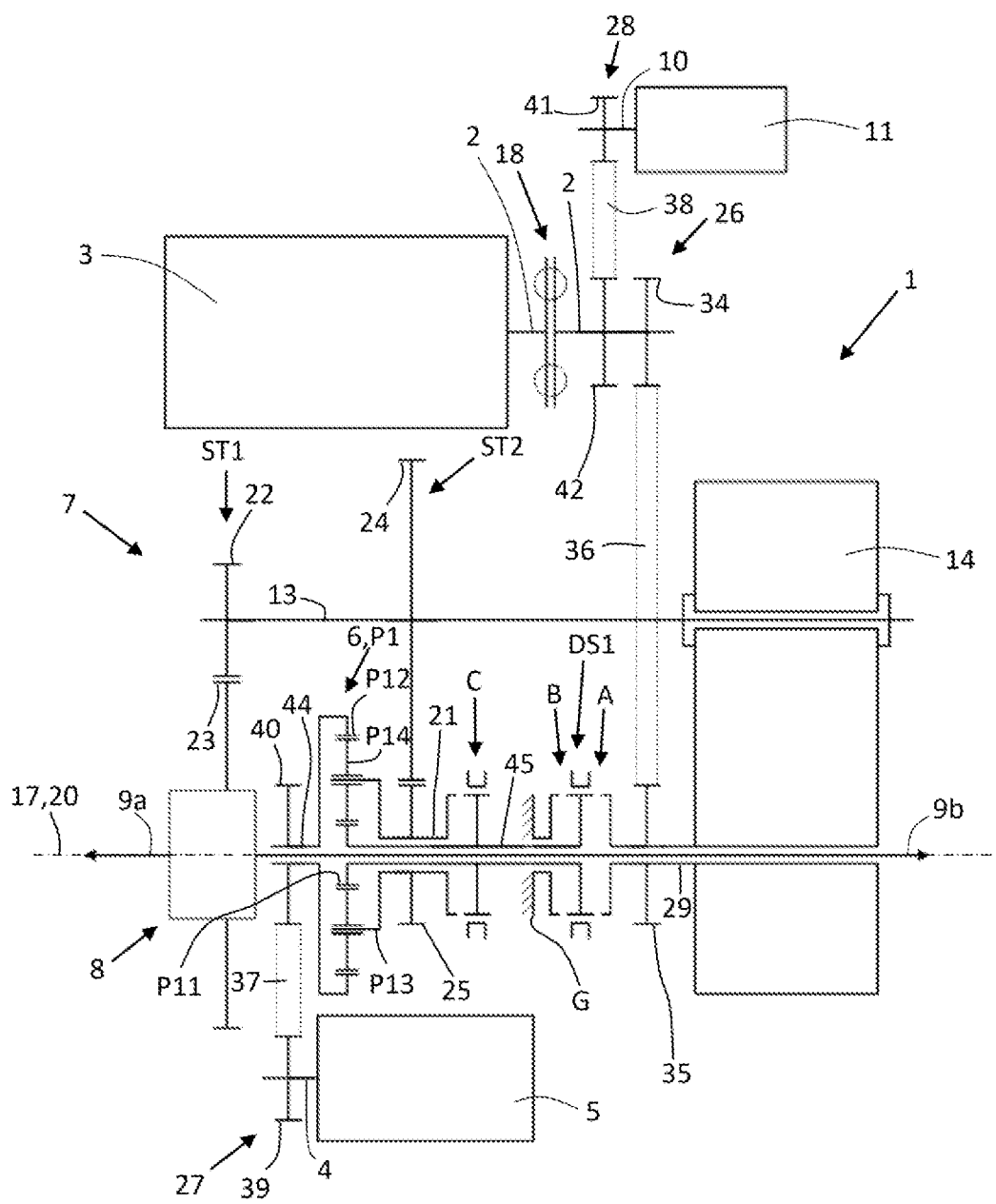
FIG. 7 shows a hybrid transmission device according to a sixth example embodiment.

FIG. 7 shows another connection example variant, in the present case an alternative connection of the transmission input and of the transmission output of the first planetary gear set P1 of the superposition gear unit 6. In particular, the points of connection of the sun gear P11 and of the ring gear P12 are interchanged, wherein the output still takes place via the planet carrier P13 of the first planetary gear set P1. In this exemplary embodiment, the fourth shaft 45 is arranged between the first shift element A and the sun gear P11. The fourth shaft 45 is permanently rotationally fixed to the sun gear P11 and, therefore, is the sun gear shaft. Consequently, the sun gear P11 is operatively connectable via the first shift element A to the internal combustion engine 3 in order to introduce the drive power of the internal combustion engine 3 into the superposition gear unit 6. By comparison, the third shaft 44, which is operatively connected to the first electric machine 5, is permanently rotationally fixed to the ring gear P12 in order to introduce the drive power of the first electric machine 5 into the superposition gear unit 6 or to support the drive torque of the internal combustion engine 3.

This varied connection of the superposition gear unit to the drives requires an alternative arrangement of the transmission components along the output axis 17. In fact, according to an axial order along the output axis 17 within the hybrid transmission device 1, the arrangement is, initially, the differential 8 with the first spur gear pair ST1 of the gear reduction stage 7, axially adjacent thereto the point of connection of the second transmission input shaft 4, i.e., the second gear stage 27, axially adjacent thereto the first planetary gear set P1 of the superposition gear unit 6, axially adjacent thereto the second spur gear pair ST2 of the gear reduction stage 7, axially adjacent thereto the third shift element C, axially adjacent thereto the second shift element B, axially adjacent thereto the first shift element A, axially adjacent thereto the point of connection of the first transmission input shaft 2, i.e., the first gear stage 26, and axially adjacent thereto the multi-speed transmission 14. In comparison to the typical electrodynamic driving-off mode according to FIG. 2 through FIG. 6, an inverse EDA mode is possible according to this example embodiment. The advantage of this type of connection of the superposition gear unit 6 is that the first electric machine 5 is operated at a lower compensating rotational speed in the electrodynamic driving-off mode.

Figure 8:
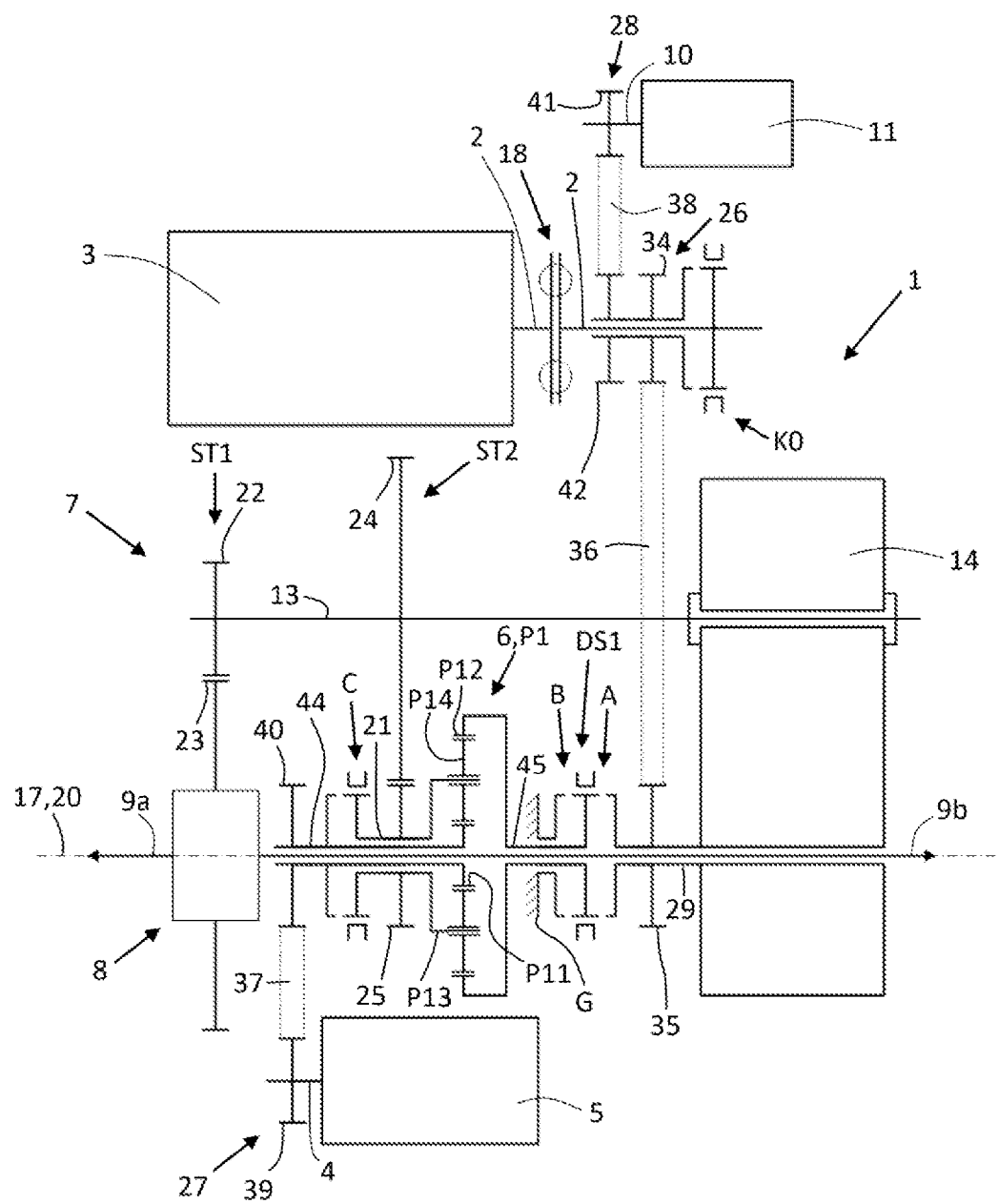
FIG. 8 shows a hybrid transmission device according to a seventh example embodiment.
Figure 9:
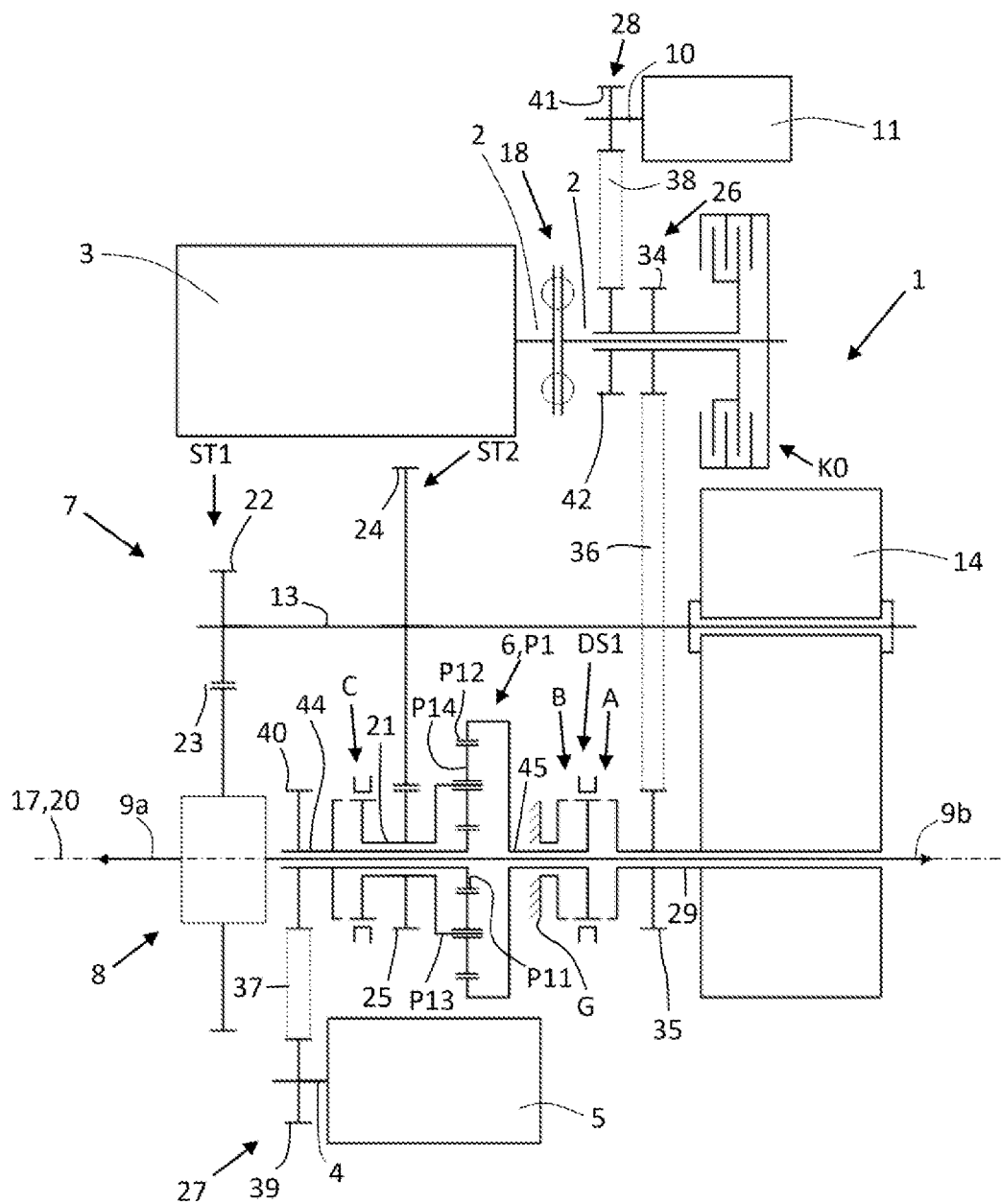
FIG. 9 shows a hybrid transmission device according to an eighth example embodiment.

The seventh example embodiment of the hybrid transmission device 1 according to FIG. 8 and the eighth example embodiment of the hybrid transmission device 1 according to FIG. 9 are both formed essentially identically to the example embodiment according to FIG. 3. The difference is that a separating clutch K0 is arranged between the connection of the second electric machine 11 and the first transmission input shaft 2 of the internal combustion engine 3. This makes it possible for the second electric machine 11 to also be usable when the internal combustion engine 3 is decoupled from the drive train. The separating clutch K0, as is also the case for the shift elements A, B, C, is switchable between a disengaged condition and an engaged condition. Therefore, reference is made to the relevant comments presented with respect to the design and mode of operation of the shift elements A, B, C. According to FIG. 8, the separating clutch K0, similarly to the shift elements A, B, C, is formed as a form-locking shift element. According to FIG. 9, the separating clutch K0 is formed as a friction-locking shift element, in the present case as a multi-disk clutch that includes disk packs bringable into frictional contact with one another. In both cases, an additional hollow shaft is provided, through which the first transmission input shaft 2 is axially guided. Axial installation space can be saved as a result. It is conceivable, however, to dispense with the separating clutch K0. The separating clutch K0 is optional, since the multi-speed transmission 14 typically has a neutral position and, thus, purely electric driving with the first electric machine 5 is also possible without the separating clutch K0. If a separating clutch K0 is not provided, as in FIG. 2 through FIG. 7 and FIG. 10 through FIG. 13, the third transmission input shaft 10 is directly and inseparably operatively connected to the first transmission input shaft 2 via the third gear stage 38.

Figure 10:
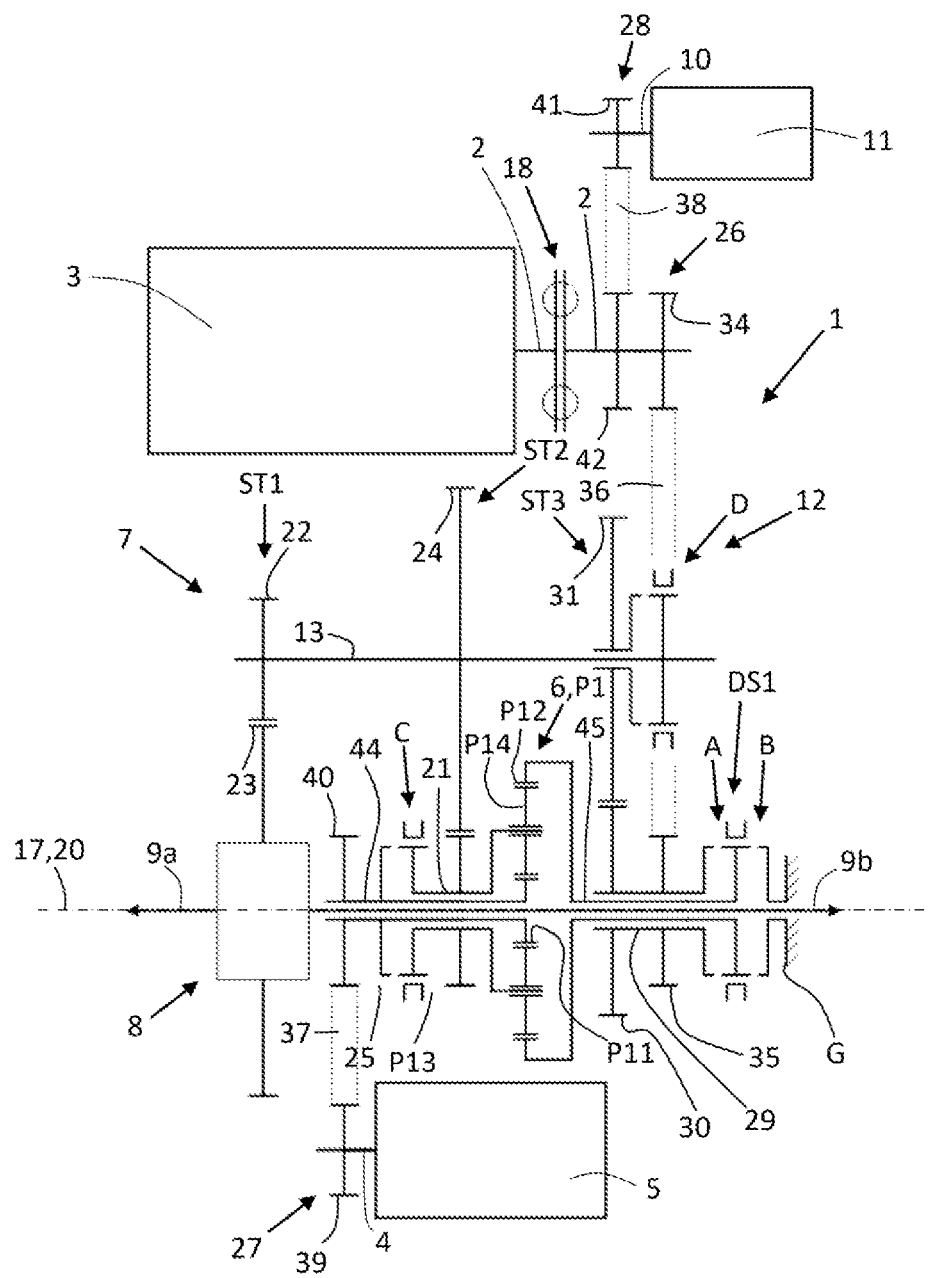
FIG. 10 shows a hybrid transmission device according to a ninth example embodiment.
Figure 11:
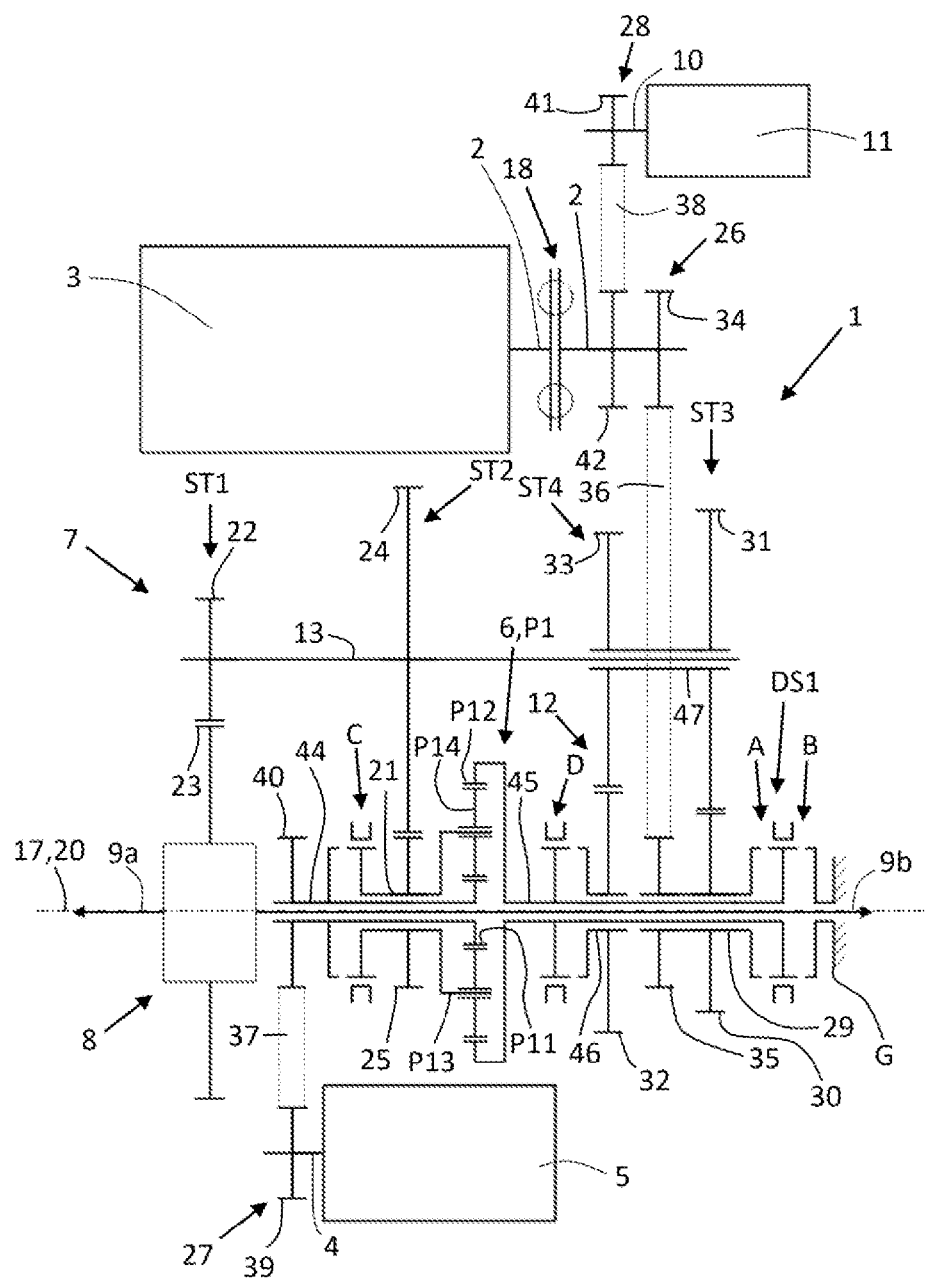
FIG. 11 shows a hybrid transmission device according to a tenth example embodiment.

The hybrid transmission device 1 according to FIG. 10 and FIG. 11 is a two-speed hybrid transmission, which enables two gear steps for forward travel and one gear step for travel in reverse. The hybrid transmission device 1 according to FIG. 10 is designed essentially similarly to the hybrid transmission device 1 according to FIG. 2. Additionally, the hybrid transmission device 1 includes a gear change transmission 12 in order to form a two- or multi-speed transmission from the above-described single-speed transmission, provided that an additional multi-speed transmission 14 is not provided. In the present case, the gear change transmission 12 is arranged so as to be axially parallel to the first transmission input shaft 2 and to the output axis 17. The gear change transmission 12 in this case has a third spur gear pair ST3 and a fourth shift element D. In contrast to the preceding exemplary embodiments, such an example embodiment of the hybrid transmission device 1 is supplemented with a second gear step in order to drive the motor vehicle in two different gear steps, i.e., with two different gear ratios in forward travel. The third spur gear pair ST3 is therefore used as a further spur gear stage in addition to the two other spur gear stages of the spur gear pairs ST1, ST2 of the gear reduction stage 7. The gear change transmission 12 is operatively arranged in the power flow between the second shaft 29, which is operatively connected via the first gear stage 26 to the first transmission input shaft 2 and the third transmission input shaft 10, and the countershaft 13 of the gear reduction stage 7. The third spur gear pair ST3 has a fifth gearwheel 30, which is permanently rotationally fixed to the second shaft 29, which is arranged coaxially to the fifth gearwheel 30, and a sixth gearwheel 31, which is meshed with the fifth gearwheel 30. The sixth gearwheel 31 is arranged coaxially to the countershaft 13. In the disengaged condition of the fourth shift element D, the sixth gearwheel 31 is rotatably mounted as an idler gear on the countershaft 13. The fourth shift element D is arranged in a plane with the first gear stage 26 and coaxially to the countershaft 13 and, with respect to the mode of operation, is formed as a form-locking shift element similarly to the shift elements A, B, and C. The fourth shift element D, in the engaged condition, is provided for rotationally fixing the sixth gearwheel 31 to the countershaft 13, such that the drive power is transmitted from the second shaft 29 via the third spur gear pair ST3 onto the gear reduction stage 7. In other words, the fourth shift element D, in the engaged condition and with the first shift element A simultaneously in the disengaged condition, is provided for drivingly connecting the internal combustion engine 3 and the second electric machine 11 directly to the gear reduction stage 7. The superposition gear unit 6 is therefore by-passed, such that a second gear ratio in a second gear step is implementable for driving the motor vehicle 100. The second gear ratio is different from a first gear ratio of the superposition gear unit 6, which is present in the first gear step. Via the superposition gear unit 6, only a drive power of the first electric machine 5 is transmitted onto the gear reduction stage 7. During the gear shift between the two gear steps for forward travel, the second electric machine 5 is connected at the output and the third shift element C is engaged. As a result, the tractive force is maintained during the gear change operation. In other words, the gear shifts are supported via the first electric machine 5 with the third shift element C engaged, as the result of which a drive output-supported powershift is enabled. The third spur gear pair ST3 is arranged along the output axis 17 axially between the planetary gear set P1 and the first gear stage 26.

The hybrid transmission device 1 according to FIG. 11 differs from the hybrid transmission device 1 according to FIG. 10 with respect to the arrangement of the fourth shift element D and with respect to the design of the gear change transmission 12. In addition to the third spur gear pair ST3, the gear change transmission 12 has a fourth spur gear pair ST4, which is arranged so as to be axially spaced apart from the gear change transmission 12. As a result, the gear change transmission 12 forms a second gear reduction stage, which is arranged coaxially to the first gear reduction stage 7 in this case. The fourth spur gear pair ST4 has, on the one hand, a seventh gearwheel 32, which is permanently rotationally fixed to a first intermediate shaft 46, which is arranged coaxially to the output axis 17 and axially spaced apart from the second shaft 29. The first intermediate shaft 46 is designed as a hollow shaft. On the other hand, the fourth spur gear pair ST4 has an eighth gearwheel 33, which is meshed with the seventh gearwheel 32. The eighth gearwheel 33 is arranged coaxially to the countershaft 13. The sixth gearwheel 31 and the eighth gearwheel 33 are permanently rotationally fixed to each other via a second intermediate shaft 47. In the disengaged condition of the fourth shift element D, the eighth gearwheel 32 is rotatably mounted as an idler gear on the fourth shaft 45. The fifth gearwheel 30 and the tenth gearwheel 35 are permanently rotationally fixed to each other via the second shaft 29.

The fourth shift element D is arranged coaxially to the output axis 17 and, in the engaged condition, is provided for rotationally fixing the fourth shaft 45 and the ring gear P12, which is arranged at the fourth shaft 45 in a rotationally fixed manner, to the first intermediate shaft 46 and to the seventh gearwheel 32, which is rotationally fixed at the first intermediate shaft 46. In the engaged condition of the fourth shift element D with the first shift element A simultaneously in the disengaged condition, the drive power coming from the first gear stage 26 is diverted via the two spur gear pairs ST3, ST4 onto the superposition gear unit 6. As a result, in a second gear step, a second gear ratio can be realized, which differs from a first gear ratio of a first gear step, which is present when the drive power coming from the first gear stage 26 is directed via the first shift element A directly into the superposition gear unit 6. The second gear ratio in the second gear step can be set by adapting the diameters and the numbers of teeth of the gearwheels 30, 31, 32, 33 of the spur gear pairs ST3, ST4. According to the exemplary embodiments according to FIG. 2 through FIG. 9, the output takes place via the superposition gear unit 6, the gear reduction stage 7, and the differential 8. The drive output-supported powershift takes place similarly to the example embodiments according to FIG. 10.

Figure 12:
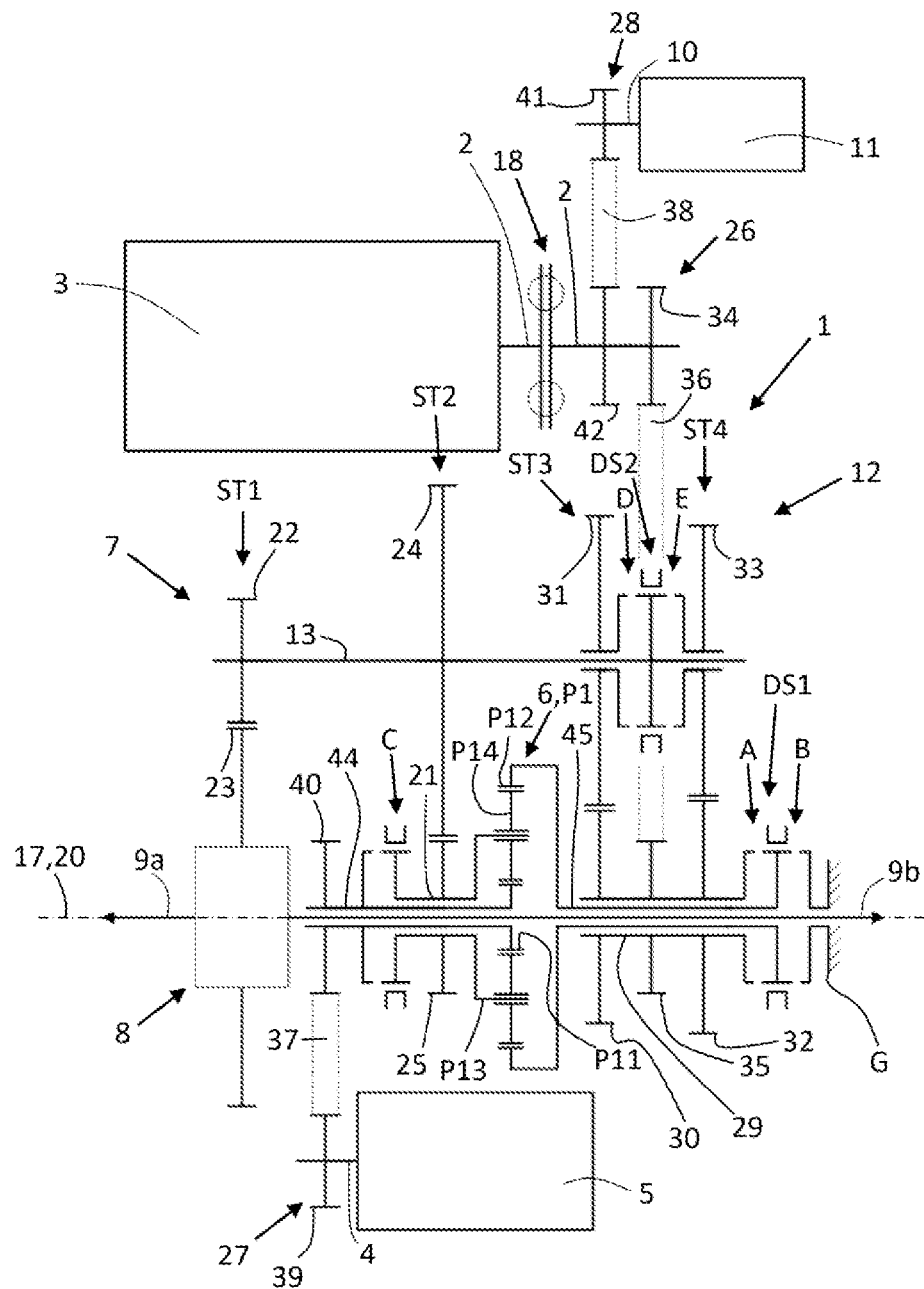
FIG. 12 shows a hybrid transmission device according to an eleventh example embodiment.
Figure 13:
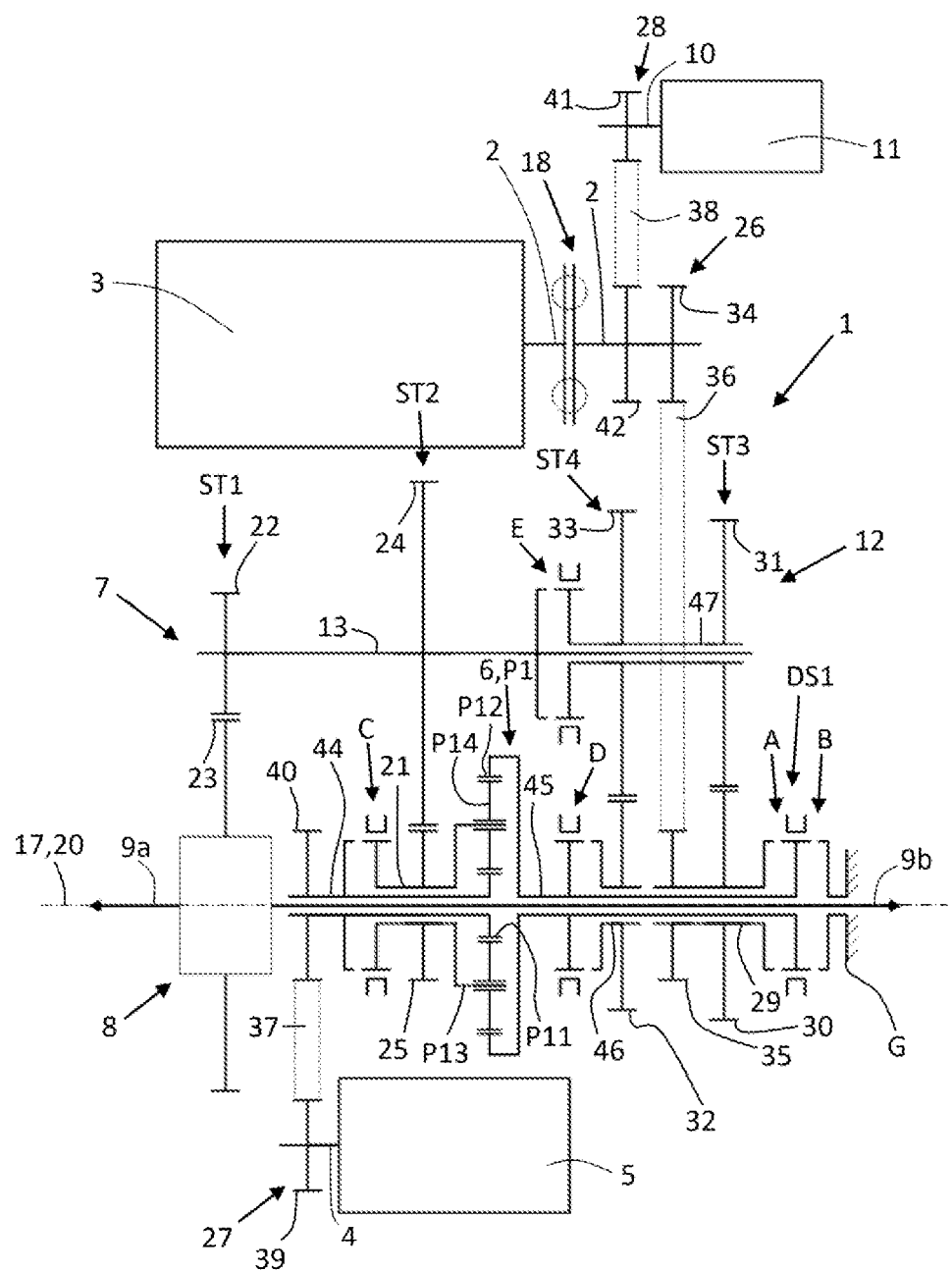
FIG. 13 shows a hybrid transmission device according to a twelfth example embodiment.

Building upon the exemplary embodiments according to FIG. 10 and FIG. 11, FIG. 12 and FIG. 13 additionally provide a fifth shift element E at the gear change transmission 12, as the result of which the hybrid transmission device 1 can be shifted between three gear steps. Therefore, the hybrid transmission device 1 according to FIG. 12 and FIG. 13 is a three-speed hybrid transmission, which enables three gear steps for forward travel and one gear step for travel in reverse.

According to FIG. 12, the fifth gearwheel 30, the tenth gearwheel 35, and the seventh gearwheel 32 are permanently rotationally fixed to the second shaft 29. The sixth and the eighth gearwheels 31, 33 are each arranged as idler gears on the countershaft 13. By engaging the fourth shift element D, the sixth gearwheel 31 is rotationally fixed to the countershaft 13, wherein the fifth shift element E is simultaneously disengaged. Similarly to FIG. 10 or FIG. 11, this implements a second gear step, wherein the superposition gear unit 6 is by-passed. Via the superposition gear unit 6, in this engagement position, only a drive power of the first electric machine 5 can be transmitted onto the gear reduction stage 7. A third gear step is implemented by engaging the fifth shift element E and simultaneously disengaging the fourth shift element D. Due to the diameters of the gearwheels 30, 31, 32, 33 of the spur gear pairs ST3, ST4, which are different in this example as well, different gear ratios are also realized in the second and the third gear steps in this case. The powershift takes place similarly to the preceding example embodiments by supporting the drive torque via the first electric machine 5. In the present example, the fourth and the fifth shift elements D, E are combined to form a second double shift unit DS2, as the result of which components and installation space are saved. The second double shift unit DS2 is arranged coaxially to the countershaft 13.

The example embodiment according to FIG. 13 builds upon the example embodiment according to FIG. 11, wherein the fifth shift element E in this case is operatively arranged at the second intermediate shaft 47 and, therefore, coaxially to the countershaft 13. In the disengaged condition of the fifth shift element E, the second intermediate shaft 47 is arranged as an idler gear on the countershaft 13. In this case, the fourth shift element D, in the engaged condition, is provided for rotationally fixing the seventh gearwheel 32 of the fourth spur gear pair ST4 to the fourth shaft 45. The fifth shift element E, in the engaged condition, is provided for rotationally fixing the second intermediate shaft 47, on which the sixth and the eighth gearwheels 31, 33 are arranged in a permanently rotationally fixed manner, to the countershaft 13. For the rest, reference is made to the comments presented above, in particular with respect to FIG. 2, FIG. 11, and FIG. 12.

It is understood that features of the approaches presented above and/or described in the claims and/or the figures may also be combined with one another in order to be able to implement, cumulatively, the advantages and effects achievable in the present case.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 hybrid transmission device
2 first transmission input shaft
3 internal combustion engine
4 second transmission input shaft
5 first electric machine
6 superposition gear unit
7 gear reduction stage
8 differential
9a first axle shaft of the differential 9b second axle shaft of the differential
10 third transmission input shaft
11 second electric machine
12 gear change transmission
13 countershaft
14 multi-speed transmission
15 transmission input
16 transmission output
17 output axis
18 device for decoupling non-uniformity of rotation
19 first axis
20 second axis
21 first shaft
22 first gearwheel
23 second gearwheel
24 third gearwheel
25 fourth gearwheel
26 first gear stage
27 second gear stage
28 third gear stage
29 second shaft
30 fifth gearwheel
31 sixth gearwheel
32 seventh gearwheel
33 eighth gearwheel
34 ninth gearwheel
35 tenth gearwheel
36 first traction mechanism
37 second traction mechanism
38 third traction mechanism
39 eleventh gearwheel
40 twelfth gearwheel
41 thirteenth gearwheel
42 fourteenth gearwheel
43 first intermediate shaft
44 third shaft
45 fourth shaft
46 first intermediate shaft
47 second intermediate shaft
100 motor vehicle
101 wheel
A first shift element
B second shift element
C third shift element
D fourth shift element
E fifth shift element
G housing
K0 separating clutch
DS1 first double shift unit
DS2 second double shift unit
P1 first planetary gear set
P11 sun gear of the first planetary gear set
P12 ring gear of the first planetary gear set
P13 planet carrier of the first planetary gear set
P14 planet gear of the first planetary gear set
ST1 first spur gear pair
ST2 second spur gear pair
ST3 third spur gear pair
ST4 fourth spur gear pair

The invention claimed is:

1. A hybrid transmission device (1) for a motor vehicle (100), comprising:
a first transmission input shaft (2) for connecting an internal combustion engine (3);
a second transmission input shaft (4) for connecting a rotor of a first electric machine (5);
a superposition gear unit (6) arranged axially parallel to the first transmission input shaft (2) and to the second transmission input shaft (4), the superposition gear unit (6) configured for connecting the first electric machine (5), the superposition gear unit (6) comprising a first planetary gear set (P1) with a sun gear (P11), a ring gear (P12), and a planet carrier (P13) with planet gears (P14) rotatably arranged thereon;
a gear reduction stage (7) comprising a first spur gear pair (ST1) and a second spur gear pair (ST2) for connecting the superposition gear unit (6) to a differential (8), wherein the differential (8) comprises a first axle shaft (9a) and a second axle shaft (9b), each of the first and second axle shafts (9a, 9b) configured for connecting a wheel of the motor vehicle, wherein the second axle shaft (9b) extends axially at least through the superposition gear unit (6);
a plurality of shift elements comprising a first shift element (A), a second shift element (B), and a third shift element (C) configured for implementing an electrodynamic driving-off process and a purely electric or hybridized drive of the motor vehicle, the first shift element (A), in the engaged condition, drivingly connecting the ring gear (P12) or the sun gear (P11) of the first planetary gear set (P1) of the superposition gear unit (6) to the internal combustion engine (3); and
a multi-speed transmission (14) operatively connected on an input side to the first transmission input shaft (2) and on an output side to a countershaft (13) of the gear reduction stage (7).

2. The hybrid transmission device (1) of claim 1, wherein the first transmission input shaft (2) is operatively connected to the first shift element (A) at least via a first traction mechanism (36) or via at least a first intermediate gear.

3. The hybrid transmission device (1) of claim 1, wherein the second transmission input shaft (4) is operatively connected at least via a second traction mechanism (37) and/or via at least a first intermediate gear to the sun gear (P11) or to the ring gear (P12) of the first planetary gear set (P1) of the superposition gear unit (6).

4. The hybrid transmission device (1) of claim 1, wherein the planet carrier (P13) of the superposition gear unit (6) is operatively connected to the second spur gear pair (ST2) of the gear reduction stage (7).

5. The hybrid transmission device (1) of claim 1, wherein two of the first, second, and third shift elements (A, B, C) are formed as a double shift unit (DS).

6. The hybrid transmission device (1) of claim 1, wherein at least two of the first, second, and third shift elements (A, B, C) are arranged axially between a point of connection of the first transmission input shaft (2) and the first planetary gear set (P1) of the superposition gear unit (6).

7. The hybrid transmission device (1) of claim 1, wherein a point of connection of the first transmission input shaft (2) is arranged axially between at least two of the first, second, and third shift elements (A, B, C) and the first planetary gear set (P1) of the superposition gear unit (6).

8. The hybrid transmission device (1) of claim 1, further comprising a third transmission input shaft (10) for connecting a rotor of a second electric machine (11), wherein the third transmission input shaft (10) is operatively connected or operatively connectable to the first transmission input shaft (2).

9. A motor vehicle (100), comprising the internal combustion engine (3) and the hybrid transmission device (1) of claim 1, wherein the internal combustion engine (3) is arranged axially parallel to the first electric machine (5) of the hybrid transmission device (1).

10. A hybrid transmission device (1) for a motor vehicle (100), comprising:
a first transmission input shaft (2) for connecting an internal combustion engine (3);
a second transmission input shaft (4) for connecting a rotor of a first electric machine (5);
a superposition gear unit (6) arranged axially parallel to the first transmission input shaft (2) and to the second transmission input shaft (4), the superposition gear unit (6) configured for connecting the first electric machine (5), the superposition gear unit (6) comprising a first planetary gear set (P1) with a sun gear (P11), a ring gear (P12), and a planet carrier (P13) with planet gears (P14) rotatably arranged thereon;
a gear reduction stage (7) comprising a first spur gear pair (ST1) and a second spur gear pair (ST2) for connecting the superposition gear unit (6) to a differential (8), wherein the differential (8) comprises a first axle shaft (9a) and a second axle shaft (9b), each of the first and second axle shafts (9a, 9b) configured for connecting a wheel of the motor vehicle, wherein the second axle shaft (9b) extends axially at least through the superposition gear unit (6);
a plurality of shift elements comprising a first shift element (A), a second shift element (B), and a third shift element (C) configured for implementing an electrodynamic driving-off process and a purely electric or hybridized drive of the motor vehicle, the second shift element (B), in the engaged condition, connecting the ring gear (P12) of the first planetary gear set (P1) of the superposition gear unit (6) or the sun gear (P11) of the first planetary gear set (P1) of the superposition gear unit (6) to a housing (G); and
a multi-speed transmission (14) operatively connected on an input side to the first transmission input shaft (2) and on an output side to a countershaft (13) of the gear reduction stage (7).

11. A motor vehicle (100), comprising the internal combustion engine (3) and the hybrid transmission device (1) of claim 10, wherein the internal combustion engine (3) is arranged axially parallel to the first electric machine (5) of the hybrid transmission device (1).

12. A hybrid transmission device (1) for a motor vehicle (100), comprising:
a first transmission input shaft (2) for connecting an internal combustion engine (3);
a second transmission input shaft (4) for connecting a rotor of a first electric machine (5);
a superposition gear unit (6) arranged axially parallel to the first transmission input shaft (2) and to the second transmission input shaft (4), the superposition gear unit (6) configured for connecting the first electric machine (5), the superposition gear unit (6) comprising a first planetary gear set (P1) with a sun gear (P11), a ring gear (P12), and a planet carrier (P13) with planet gears (P14) rotatably arranged thereon;
a gear reduction stage (7) comprising a first spur gear pair (ST1) and a second spur gear pair (ST2) for connecting the superposition gear unit (6) to a differential (8), wherein the differential (8) comprises a first axle shaft (9a) and a second axle shaft (9b), each of the first and second axle shafts (9a, 9b) configured for connecting a wheel of the motor vehicle, wherein the second axle shaft (9b) extends axially at least through the superposition gear unit (6); and
a plurality of shift elements comprising a first shift element (A), a second shift element (B), and a third shift element (C) configured for implementing an electrodynamic driving-off process and a purely electric or hybridized drive of the motor vehicle, the third shift element (C) being configured for interlocking the first planetary gear set (P1) of the superposition gear unit (6).

13. A motor vehicle (100), comprising the internal combustion engine (3) and the hybrid transmission device (1) of claim 12, wherein the internal combustion engine (3) is arranged axially parallel to the first electric machine (5) of the hybrid transmission device (1).

14. The hybrid transmission device (1) of claim 12, wherein a multi-speed transmission (14) is operatively connected on an input side to the first transmission input shaft (2) and on an output side to a countershaft (13) of the gear reduction stage (7).

15. A hybrid transmission device (1) for a motor vehicle (100), comprising:
a first transmission input shaft (2) for connecting an internal combustion engine (3);
a second transmission input shaft (4) for connecting a rotor of a first electric machine (5);
a superposition gear unit (6) arranged axially parallel to the first transmission input shaft (2) and to the second transmission input shaft (4), the superposition gear unit (6) configured for connecting the first electric machine (5), the superposition gear unit (6) comprising a first planetary gear set (P1) with a sun gear (P11), a ring gear (P12), and a planet carrier (P13) with planet gears (P14) rotatably arranged thereon;
a gear reduction stage (7) comprising a first spur gear pair (ST1) and a second spur gear pair (ST2) operatively connecting the superposition gear unit (6) to a differential (8), wherein the differential (8) comprises a first axle shaft (9a) and a second axle shaft (9b), each of the first and second axle shafts (9a, 9b) configured for connecting a wheel of the motor vehicle, wherein the second axle shaft (9b) extends axially at least through the superposition gear unit (6);
a plurality of shift elements comprising a first shift element (A), a second shift element (B), and a third shift element (C) configured for implementing an electrodynamic driving-off process and a purely electric or hybridized drive of the motor vehicle; and
a gear change transmission (2) arranged axially parallel to the first transmission input shaft (2), wherein the gear change transmission (12) comprises a third spur gear pair (ST3) and a fourth shift element (D) for shifting the hybrid transmission device (1) between at least two gear steps.

16. The hybrid transmission device (1) of claim 15, wherein the gear change transmission (12) comprises a fifth shift element (E) for shifting the hybrid transmission device (1) between at least three gear steps.

17. A motor vehicle (100), comprising the internal combustion engine (3) and the hybrid transmission device (1) of claim 15, wherein the internal combustion engine (3) is arranged axially parallel to the first electric machine (5) of the hybrid transmission device (1).

18. The hybrid transmission device (1) of claim 15, wherein a multi-speed transmission (14) is operatively connected on an input side to the first transmission input shaft (2) and on an output side to a countershaft (13) of the gear reduction stage (7).

* * * * *